(12) United States Patent
Sakai et al.

(10) Patent No.: US 10,397,483 B2
(45) Date of Patent: Aug. 27, 2019

(54) IMAGE PROCESSING DEVICE, IMAGE PROCESSING SYSTEM AND NON-TRANSITORY COMPUTER READABLE MEDIUM STORING PROGRAM

(71) Applicant: FUJI XEROX CO., LTD., Tokyo (JP)

(72) Inventors: Noriko Sakai, Yokohama (JP); Toshihiro Iwafuchi, Yokohama (JP); Masashi Morimoto, Yokohama (JP); Yusuke Izumisawa, Yokohama (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/920,529

(22) Filed: Mar. 14, 2018

(65) Prior Publication Data

US 2019/0098218 A1 Mar. 28, 2019

(30) Foreign Application Priority Data

Sep. 27, 2017 (JP) ................................ 2017-187250

(51) Int. Cl.
*H04N 5/232* (2006.01)
*H04N 5/262* (2006.01)

(52) U.S. Cl.
CPC ..... *H04N 5/23293* (2013.01); *H04N 5/23216* (2013.01); *H04N 5/262* (2013.01)

(58) Field of Classification Search
CPC . H04N 5/23293; H04N 5/23216; H04N 5/262
See application file for complete search history.

(56) References Cited

U.S. PATENT DOCUMENTS

| 2005/0163369 A1* | 7/2005 | Jyou | G06T 11/001 382/167 |
| 2005/0174586 A1* | 8/2005 | Yoshida | G06T 11/001 358/1.9 |
| 2008/0007564 A1* | 1/2008 | Tokunaga | G06T 11/001 345/594 |
| 2013/0021628 A1* | 1/2013 | Nakamura | H04N 1/6055 358/1.9 |

(Continued)

FOREIGN PATENT DOCUMENTS

JP 2009-225479 A 10/2009

*Primary Examiner* — Nhan T Tran
(74) *Attorney, Agent, or Firm* — Sughrue Mion, PLLC

(57) ABSTRACT

An image processing device includes: an acceptance unit that accepts an image information pair composed of image information before color conversion and image information after color conversion; an accuracy output unit that outputs accuracy of a color conversion property from the plural accepted image information pairs; a color conversion property creation unit that creates the color conversion property from the plural accepted image information pairs; and a display control unit that, when the acceptance unit accepts a new image information pair, controls to display, on a display device, at least image information created by color conversion of image information of the new image information pair before color conversion based on the color conversion property created by the color conversion property creation unit from the image information pair that has already been accepted by the acceptance unit and image information of the new image information pair after color conversion.

10 Claims, 16 Drawing Sheets

(56) References Cited

U.S. PATENT DOCUMENTS

2015/0199938 A1* 7/2015 Horikawa .............. G09G 5/02
  345/690
2016/0088193 A1* 3/2016 Ishizuka .............. H04N 1/603
  358/3.24
2017/0078633 A1* 3/2017 Sugaya .................... H04N 9/07

* cited by examiner

FIRST IMAGE

IMAGE BEFORE COLOR ADJUSTMENT

IMAGE AFTER COLOR ADJUSTMENT

IMAGE BEFORE
COLOR ADJUSTMENT

IMAGE INFORMATION
BEFORE COLOR ADJUSTMENT

RGBa1={0,0,255}
RGBa2={0,32,255}
RGBa3={0,64,255}
RGBa4={0,96,255}
RGBa5={0,128,255}

IMAGE AFTER
COLOR ADJUSTMENT

IMAGE INFORMATION
AFTER COLOR ADJUSTMENT

RGBb1={16,0,255}
RGBb2={16,32,255}
RGBb3={32,64,255}
RGBb4={32,96,255}
RGBb5={64,128,255}

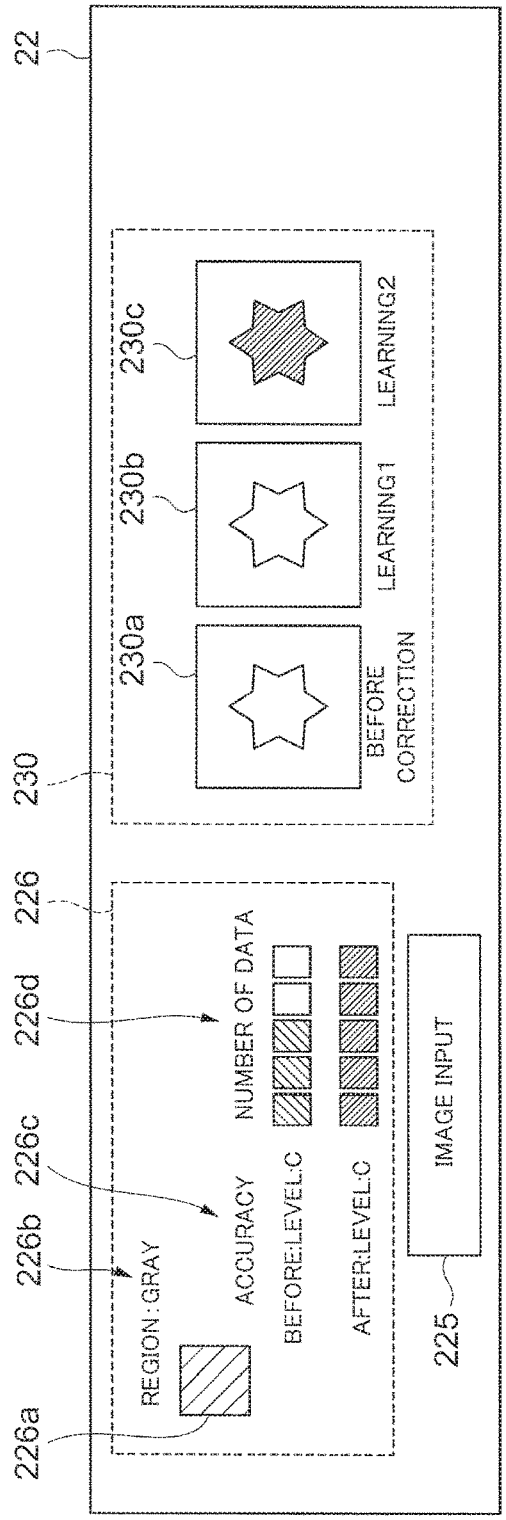
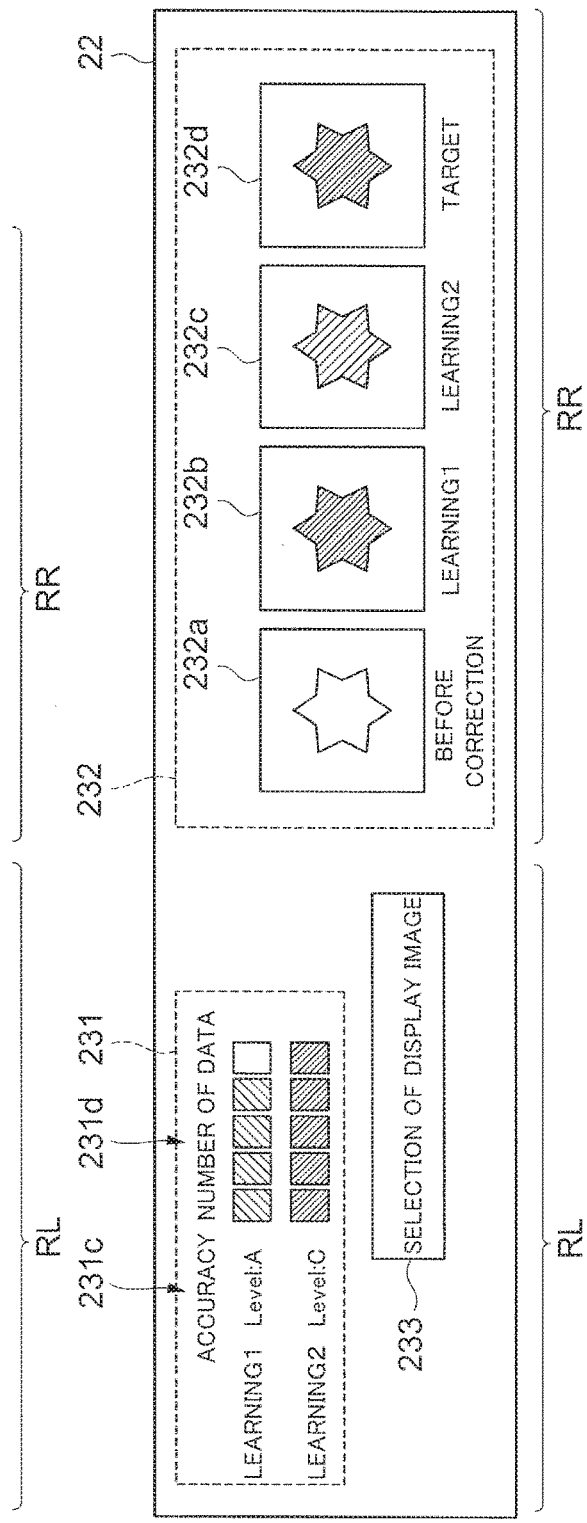

FIG.9

| | | LEARNING (INITIAL) LEVEL | RE-LEARNING LEVEL |
|---|---|---|---|
| RED | ▨ | 5 | 5 |
| WHITE | ☐ | 3 | 2 |
| GRAY | ▨ | 2 | 4 |
| BEIGE | ▨ | 3 | 3 |
| BLUE | ▨ | 1 | 3 |
| YELLOW | ▨ | 4 | 4 |

EVALUATION INPUT

PLEASE INPUT EVALUATION OF GRAY.

○ 1　　○ 2　　● 3　　○ 4　　○ 5

[ OK ]　[ CANCEL ]

IMAGE PROCESSING DEVICE, IMAGE PROCESSING SYSTEM AND NON-TRANSITORY COMPUTER READABLE MEDIUM STORING PROGRAM

CROSS REFERENCE TO RELATED APPLICATIONS

This application is based on and claims priority under 35 USC § 119 from Japanese Patent Application No. 2017-187250 filed Sep. 27, 2017.

BACKGROUND

Technical Field

The present invention relates to an image processing device, an image processing system and a non-transitory computer readable medium storing a program.

Related Art

In recent years, due to popularization of appliances, such as smartphones or tablets, users taking and/or browsing digital images have been increased. At this occasion, photographing environments vary according to effects of illumination light or the like, and photographing subjects also vary. Therefore, after photographing, it is sometimes found that a photographed image is not what a user intended; accordingly, colors or the like of the photographed image are adjusted in general.

SUMMARY

According to an aspect of the present invention, an image processing device including: an acceptance unit that accepts an image information pair composed of image information before color conversion and image information after color conversion; an accuracy output unit that outputs accuracy of a color conversion property from the plural image information pairs accepted by the acceptance unit; a color conversion property creation unit that creates the color conversion property from a plural image information pairs accepted by the acceptance unit; and a display control unit that, when the acceptance unit accepts a new image information pair, controls to display, on a display device, at least image information created by color conversion of image information of the new image information pair before color conversion based on the color conversion property created by the color conversion property creation unit from the image information pair that has already been accepted by the acceptance unit and image information of the new image information pair after color conversion.

BRIEF DESCRIPTION OF THE DRAWINGS

Exemplary embodiments of the present invention will be described in detail based on the following figures, wherein:

FIG. 8A is a diagram showing a second example in which display information created by the second accuracy evaluation display unit is displayed on the display unit of the display device;

FIG. 8B is a diagram showing a third example in which display information created by the second accuracy evaluation display unit is displayed on the display unit of the display device;

FIG. 9 is a diagram showing a fourth example in which display information created by the second accuracy evaluation display unit is displayed on the display unit of the display device;

FIG. 10 is a diagram showing an example in which a user's evaluation acceptance screen is displayed on the display unit;

DETAILED DESCRIPTION

Hereinafter, exemplary embodiments according to the present invention will be described in detail with reference to attached drawings.

<Description of Entire Image Processing System>

Figure 1:
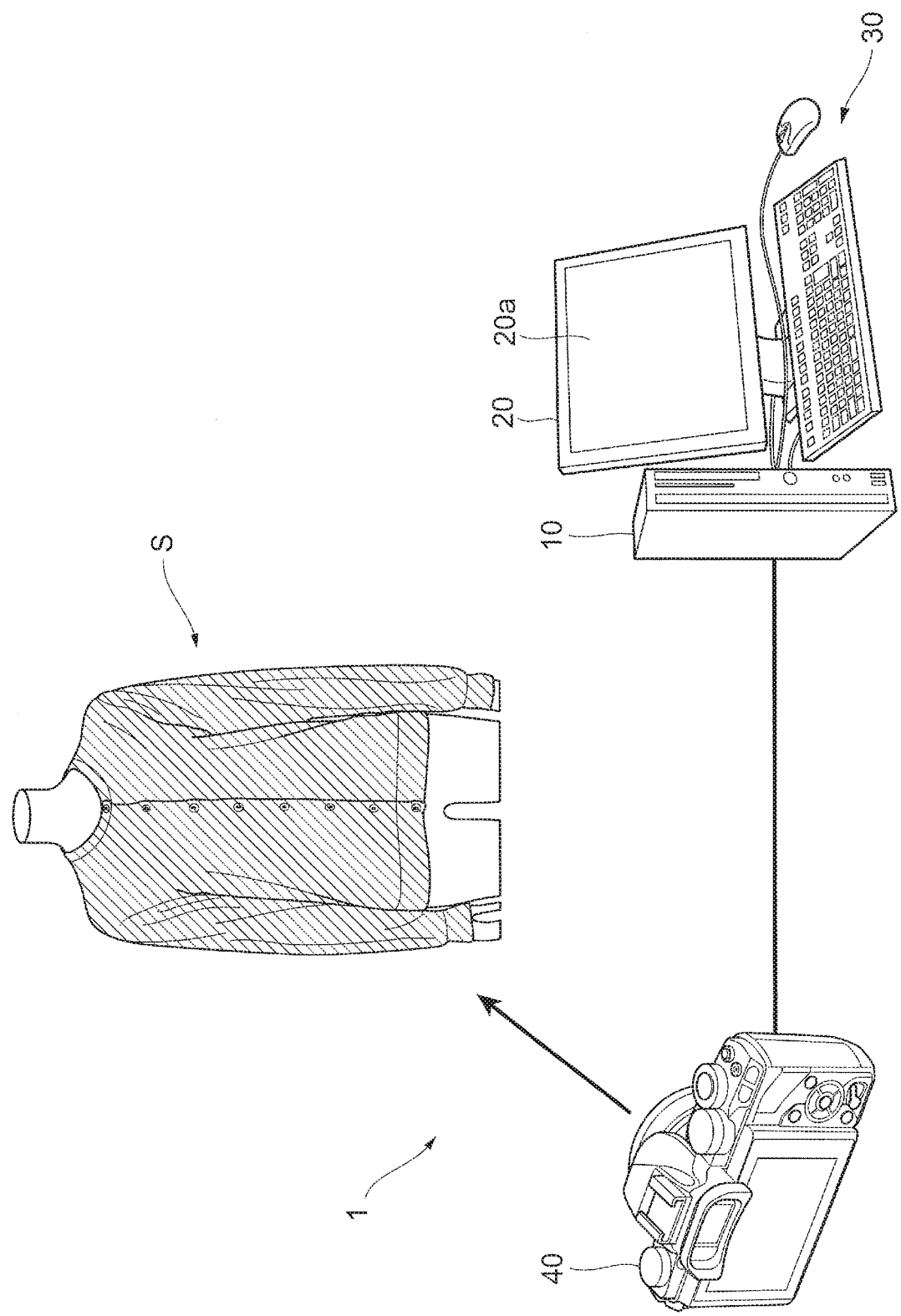
FIG. 1 is a diagram showing a configuration example of an image processing system in the exemplary embodiments.

FIG. 1 is a diagram showing a configuration example of an image processing system 1 in the exemplary embodiments.

As shown in the figure, the image processing system 1 of the exemplary embodiments includes: an image processing device 10 that performs color adjustment (color conversion) to an original image taken by a camera 40; a display device 20 that displays an image based on display information outputted by the image processing device 10; an input device 30 that allows a user to input various kinds of information items to the image processing device 10; and a camera 40 that takes a photographing subject S and creates image information to be subjected to color adjustment by the image processing device 10.

The image processing device 10 is, for example, a so-called general-purpose personal computer (PC). Then, under the control by an OS (Operating System), the image processing device 10 performs color adjustment or the like by causing various kinds of application software to operate.

The image processing device 10 includes: a CPU (Central Processing Unit) as a computation unit; and a main memory and an HDD (Hard Disk Drive) as a storage unit. Here, the CPU executes various kinds of software, such as an OS (Operating System, basic software) or application programs (application software). Moreover, the main memory is a storage region that stores various kinds of software or data or the like used for executing thereof, and the HDD is a storage region that stores input data for various kinds of software or output data from various kinds of software.

Further, the image processing device 10 includes a communication interface (hereinafter, referred to as "communication I/F") 14 for communicating with the outside and an input device, such as a keyboard or a mouse.

The display device 20 displays an image on a display screen 20a. The display device 20 is composed of a device having a function of displaying an image, such as, for example, a liquid crystal display for PC, a liquid crystal display television or a projector. Consequently, the display method in the display device 20 is not limited to the liquid crystal display method. Note that, in the example shown in FIG. 1, the display screen 20a is provided inside the display device 20; however, when, for example, a projector is used as the display device 20, the display screen 20a is a screen or the like provided outside the display device 20.

The input device 30 is configured with a keyboard, a mouse or the like. The input device 30 is used to start or exit application software for performing color adjustment, or, when color adjustment is to be performed, to input instructions for performing color adjustment to the image processing device 10 by a user.

The camera 40 is an example of a photographing device and includes, for example, an optical system that converges incident light and an image sensor that is an imaging unit to detect the light converged by the optical system.

The optical system is configured with a single lens or by combining plural lenses. In the optical system, due to a combination of lenses, coating applied to a lens surface, and so forth, various kinds of aberrations are removed. The image sensor is configured by arranging imaging elements, such as CCDs (charge coupled devices) or CMOS (complementary metal oxide semiconductor) elements.

The image processing device 10 and the display device 20 are connected via a DVI (Digital Visual Interface). Note that, it may be possible to perform connection via an HDMI (a registered trademark, High-Definition Multimedia Interface), a DisplayPort, or the like, instead of the DVI.

Moreover, the image processing device 10 and the input device 30 are connected via, for example, a USB (Universal Serial Bus). Note that, in place of a USB, connection may be made via an IEEE1394, an RS-232C, or the like.

Further, in the example shown in the figure, the image processing device 10 and the camera 40 are connected by wire, and, for example, connected via a USB, an IEEE1394 or an RS-232C. Consequently, image information of an image taken by the camera 40 is sent to the image processing device 10 by wire. However, the connection is not limited thereto, and it may be possible to adopt wireless connection, such as using wireless LAN (Local Area Network) or Bluetooth (registered trademark). Further, it may be possible to pass the image information to the image processing device 10 via a memory card, such as an SD card, or the like, without connecting the image processing device 10 and the camera 40.

In such an image processing system 1, first, a user takes a photograph of a photographing subject S by the camera 40. The image taken by the camera 40 is an original image, and image information of the original image is sent to the image processing device 10. On the display device 20, the original image, which is an image before color adjustment, is displayed. Next, when the user inputs instructions for performing color adjustment to the image processing device 10 by use of the input device 30, color adjustment is performed on the original image by the image processing device 10. The result of the color adjustment is, for example, is reflected in an image to be displayed on the display device 20, and thereby, an image after color adjustment, which is different from the image before color adjustment, is rendered again and displayed on the display device 20.

Moreover, as the image after color adjustment, other than the image after color adjustment by the image processing device 10, another image photographed by another camera having model properties different from those of the camera 40, that is, different photographing conditions, may be adopted. In this case, the image taken by the camera 40 can be assumed to be the image before color adjustment, and another image taken by a camera with different photographing conditions can be assumed to be the image after color adjustment.

Moreover, in the image processing device 10, based on the result of the color adjustment, a color conversion property (a color conversion model) is created. Here, "color conversion model" refers to a relationship between image information before color adjustment and image information after color adjustment. Moreover, it can be said that "color conversion model" is a function representing the relationship between image information before color adjustment and image information after color adjustment. Moreover, though, to be described in detail later, upon considering a color conversion vector with image information before color adjustment as a starting point and image information after color adjustment as an ending point, it is also possible to say that "color conversion model" is an aggregate of color conversion vectors (color conversion vector group). For example, when image information is RGB data composed of Red (R), Green (G) and Blue (B), assuming that image information before color adjustment is represented as ($R_a$, $G_a$, $B_a$) and image information after color adjustment is represented as ($R_b$, $G_b$, $B_b$), a color conversion model represents a relationship between ($R_a$, $G_a$, $B_a$) and ($R_b$, $G_b$, $B_b$).

Further, in the image processing device 10, based on the color conversion model, a conversion relationship, which performs color conversion from image information of an original image before color adjustment into image information after color adjustment, is created. Here, "conversion relationship" refers to conversion information for converting image information before color adjustment into image information after color adjustment. The conversion relationship can be created as an LUT (Lookup Table). The LUT can be a multi-dimensional LUT. Moreover, the LUT can also be a one-dimensional LUT. Further, the conversion relationship may be a multi-dimensional matrix, not an LUT. The conversion relationship may be retained as, other than the multi-dimensional LUT, the LUT and the matrix, teacher data (input-output data pair) for learning.

The conversion relationship is, when image information is RGB data, information for converting ($R_a$, $G_a$, $B_a$), which is image information before color adjustment, into ($R_b$, $G_b$, $B_b$), which is image information after color adjustment, namely, ($R_a$, $G_a$, $B_a$)→($R_b$, $G_b$, $B_b$). By use of the conversion relationship, color adjustment similar to previously performed color adjustment can be reproduced. In other words, when image information before color adjustment is newly generated, it is possible to perform color adjustment similar to previously performed color adjustment, to thereby create image information after color adjustment by performing color conversion by use of the conversion relationship.

When the conversion relationship is represented by a multi-dimensional LUT, here, the relationship is represented by a three-dimensional LUT, to directly convert $(R_a, G_a, B_a)$ into $(R_b, G_b, B_b)$. In other words, the conversion relationship performs $(R_a, G_a, B_a) \rightarrow (R_b, G_b, B_b)$. Moreover, when the conversion relationship is represented by a one-dimensional LUT, each of R, G, B is converted. In other words, the conversion relationship performs $R_a \rightarrow R_b$, $G_a \rightarrow G_b$, and $B_a \rightarrow B_b$. In the exemplary embodiments, conversion in the RGB color space is exemplified; however, conversion in other color spaces, such as CMYK, may be adopted. In this case, image information is CMYK data composed of respective colors of C (cyan), M (magenta), Y (yellow) and K (black). Then, when the conversion relationship is the multi-dimensional LUT, the LUT is a four-dimensional LUT performing conversion of image information before color adjustment $(C_a, M_a, Y_a, K_a)$ into image information after color adjustment $(C_b, M_b, Y_b, K_b)$, namely, $(C_a, M_a, Y_a, K_a) \rightarrow (C_b, M_b, Y_b, K_b)$. Moreover, when the conversion relationship is represented by a one-dimensional LUT, each of C, M, Y, K is converted. In other words, the conversion relationship performs $C_a \rightarrow C_b$, $M_a \rightarrow M_b$, $Y_a \rightarrow Y_b$ and $K_a \rightarrow K_b$.

Note that the image processing system 1 in the exemplary embodiments is not limited to the mode in FIG. 1. For example, as the image processing system 1, a tablet terminal can be exemplified. In this case, the tablet terminal includes a touch panel, which displays images and accepts input of user's instructions, such as a touch. In other words, the touch panel functions as the display device 20 and the input device 30. Note that, as the camera 40, a built-in camera in the tablet terminal can be used. Moreover, similarly, as a device integrating the display device 20 and the input device 30, a touch monitor can be used. This is the touch panel used as the above-described display screen 20a of the display device 20. In this case, based on image information outputted by the image processing device 10, an image is displayed on the touch monitor. A user inputs instructions for performing color adjustment by touching the touch monitor, or the like.

Here, when the image processing device 10 is to create the conversion relationship, as described above, it is necessary to obtain image information before color adjustment from an original image and to obtain image information after color adjustment from an image after color adjustment. In other words, it is necessary to obtain the image information before color adjustment and the image information after color adjustment corresponding thereto as an image information pair.

At this time, if an accuracy of plural pairs of image information before color adjustment and image information after color adjustment is poor, it becomes difficult to create highly accurate color conversion model, and thereby an accuracy of the conversion relationship is reduced. Specifically, there are some cases in which, when the color adjustment is to be performed, data of different directionality in color adjustment is mixed, and those cases contribute to reduction in accuracy with respect to the color conversion model derived from plural pairs of image information. As factors causing the phenomenon include, for example, a case in which a user performing color adjustment has a problem with his/her skill level and a case in which there are differences in environments to perform color adjustment. The differences in environments include, for example, differences in device properties of the display device 20 to be used and differences in illumination environments. If data having different directionality in color adjustment enters, directionality in color adjustment lacks integrity; therefore, it becomes difficult to create highly accurate color conversion model. Then, when color adjustment is performed by a conversion relationship created as a result thereof, for example, color adjustment that differs from a request is performed, or magnitude of color adjustment is moderated, and thereby color adjustment with a small amount of change is performed.

As described above, "accuracy" with respect to plural pairs of image information before color adjustment and image information after color adjustment is an index indicating whether or not the directionality in color adjustment shows unity. Moreover, it can also be said that "accuracy" is an index indicating a degree of quality of plural pairs of image information before color adjustment and image information after color adjustment in creating the color conversion model or the conversion relationship. Though details will be described later, "accuracy" can be quantified based on a color conversion vector with image information before color conversion as a starting point and image information after color conversion as an ending point, to be evaluated. Here, "accuracy" may be targeted at entirety of the plural pairs of image information pieces serving as a base for creating a color conversion model, or targeted at part of the plural pairs of image information pieces serving as a base for creating a color conversion model.

In this manner, a highly accurate color conversion model is needed. However, it is difficult for a user to determine the accuracy. Moreover, when a highly accurate color conversion model cannot be achieved, it is difficult to recognize where a problem is.

Therefore, the exemplary embodiments focus the existence of relationship between the accuracy of the color conversion model and the accuracy of plural pairs of image information before color adjustment and image information after color adjustment, and cause the above-described problem to hardly occur by configuring the image processing device 10 as follows. In other words, by evaluating the accuracy with respect to the plural pairs of image information before color adjustment and image information after color adjustment, the accuracy of the color conversion model created based on the plural pairs of image information pieces is quantitatively evaluated.

Note that, hereinafter, items first inputted by a user as an image before color adjustment and an image after color adjustment are referred to as "first image" in some cases. It can also be said that "first image" is a basic set of images as pairs of an image before color adjustment and an image after color adjustment. Moreover, as an image before color adjustment and an image after color adjustment, items inputted by a user for confirming the accuracy with respect to plural pairs of image information before color adjustment and image information after color adjustment are referred to as "second image" in some cases. It can also be said that "second image" is a set of images for evaluating the accuracy by a user as pairs of an image before color adjustment and an image after color adjustment. Further, items inputted by a user in addition to the first image as an image before color adjustment and an image after color adjustment are referred to as "third image" in some cases. It can also be said that "third image" is a set of images added to the first image as pairs of an image before color adjustment and an image after color adjustment.

<Description of Image Processing Device 10 and Display Device 20>

Next, the image processing device 10 and the output device 20 will be described.

Figure 2:
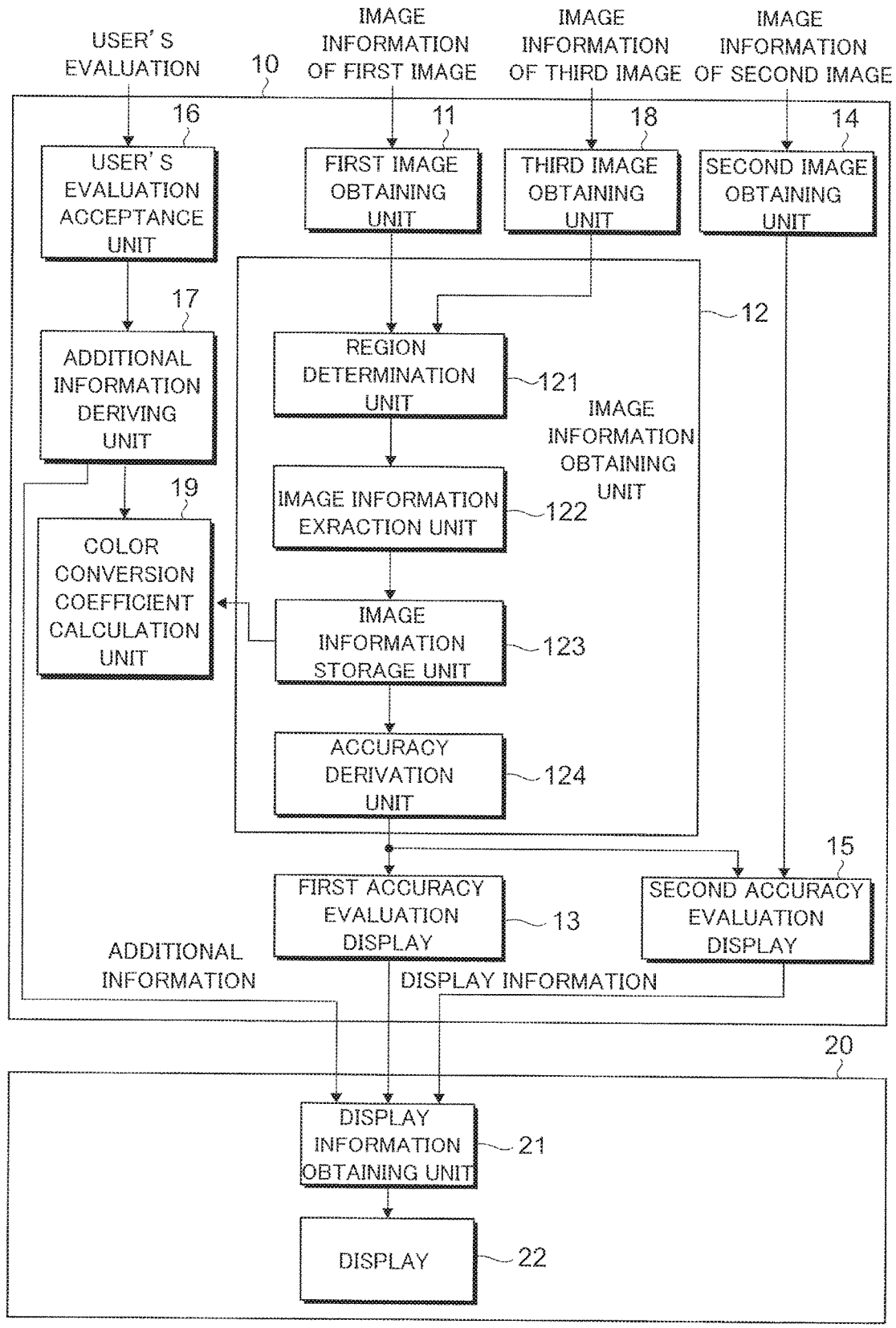
FIG. 2 is a block diagram showing a functional configuration example of an image processing device and a display device in the exemplary embodiments.

FIG. 2 is a block diagram showing a functional configuration example of the image processing device 10 and the display device 20 in the exemplary embodiments. Note that, in FIG. 2, of the various functions included in the image processing device 10 and the display device 20, those related to the exemplary embodiment are selected and shown.

As shown in the figure, the image processing device 10 of the exemplary embodiments includes: a first image obtaining unit 11 that obtains first image information; an image information obtaining unit 12 that obtains an image information pair from the first image; a first accuracy evaluation display 13 that displays an image for evaluating accuracy of plural pairs of image information pieces; a second image obtaining unit 14 that obtains image information of a second image for evaluation; a second accuracy evaluation display 15 that displays an image for evaluating accuracy of plural pairs of image information pieces based on the image information of the second image; a user's evaluation acceptance unit 16 that accepts user's evaluation; an additional information deriving unit 17 that requests information of an additional image when addition of an image is required; a third image obtaining unit 18 that obtains image information of a third image, which is an additional image; and a color conversion coefficient calculation unit 19 that calculates a color conversion coefficient as a conversion relationship.

Moreover, the display device 20 includes: a display information obtaining unit 21 that obtains display information for displaying an image from the image processing device 10; and a display 22 that displays an image based on the display information. The display 22 corresponds to the display screen 20a described above.

The first image obtaining unit 11 obtains image information of each of the image before color adjustment and the image after color adjustment, which are the first image.

These image information pieces have a data format for executing display on the display device 20, which is, for example, the above-described RGB data. Note that the first image obtaining unit 11 may obtain image information in other data formats and perform color conversion to create the RGB data or the like.

Consequently, the first image obtaining unit 11 functions as an acceptance unit that accepts image information pairs, each of which is composed of image information before color conversion and image information after color conversion.

FIGS. 3A to 3F are diagrams showing examples of the first image obtained by the first image obtaining unit.

Figure 3A:
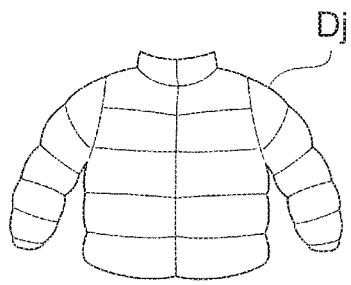
FIGS. 3A to 3F are diagrams showing examples of a first image obtained by a first image obtaining unit.
Figure 3B:
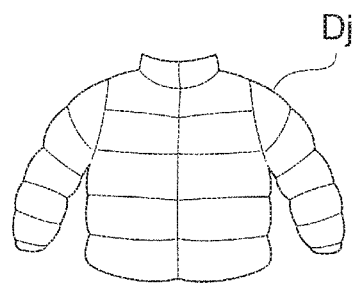
Figure 3C:
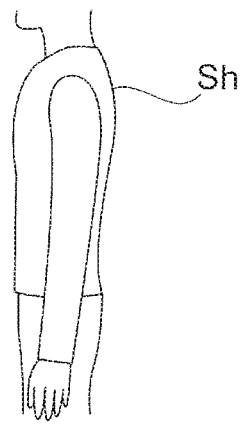
Figure 3D:
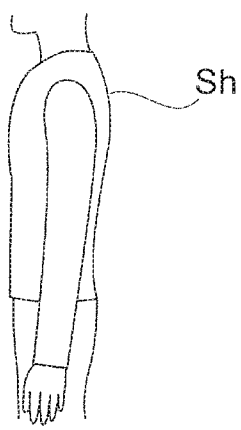
Figure 3E:
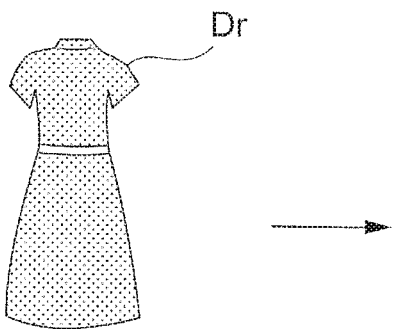
Figure 3F:
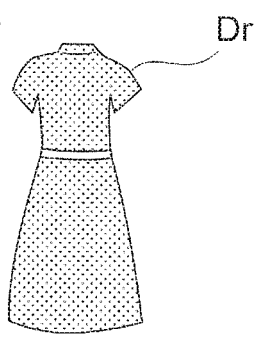

Here, a case is shown in which three pairs of image information pieces when photographing clothing that is a commercial product or a person wearing clothing that is a commercial product are prepared. Of these, each of FIGS. 3A and 3B is a first image when a down jacket Dj is photographed. Here, FIG. 3A shows an image before color adjustment and FIG. 3B shows an image after color adjustment. Similarly, each of FIGS. 3C and 3D is a first image when a person wearing a shirt Sh is photographed. Here, FIG. 3C shows an image before color adjustment and FIG. 3D shows an image after color adjustment. Further, each of FIGS. 3E and 3F is a first image when a person wearing a dress Dr is photographed. Here, FIG. 3E shows an image before color adjustment and FIG. 3F shows an image after color adjustment.

As described above, in the exemplary embodiments, by preparing plural pairs of the image before color adjustment and the image after color adjustment, image information pairs including more colors are obtained.

The image information obtaining unit 12 includes, as shown in FIG. 2: a region determination unit 121 that determines regions of the image before color adjustment and the image after color adjustment, from which image information is to be extracted; an image information extraction unit 122 that extracts image information pairs; an image information memory 123 that stores the extracted image information pairs; and an accuracy derivation unit 124 that calculates accuracy of the image information pairs.

The region determination unit 121 determines, of any one of the image before color adjustment and the image after color adjustment, a region from which image information is to be extracted.

In other words, the region determination unit 121 determines, for example, from the images shown in FIGS. 3A to 3F, from which position the image information is to be obtained. In this case, color adjustment is performed on the locations of clothing, which is a commercial product. In other words, as to colors of a commercial product, it is required to perform color reproduction more precisely, to thereby to match the color of the commercial product displayed as an image with the color of the actual commercial product. Therefore, a color of a commercial product is likely to be a subject of color adjustment.

Specifically, for example, the region determination unit 121 determines a location other than a background to be a region from which image information is to be extracted. Therefore, the region determination unit 121 is required to discriminate between the background and a location other than the background. Here, image information of the background is almost the same as image information at the left end of the image. Therefore, it is possible to assume a location, in which image information significantly changes from the image information of the left end of the image, to be the location other than the background. At this time, for sampling image information to be compared with the image information at the left end of the image, for example, pixel positions are determined in the image at predetermined intervals, and image information of each of the pixels is compared with the image information of the pixel at the left end of the image. Moreover, it may be possible that a mask of a predetermined size is applied to image information and an average value of image information within the mask is compared with the image information of the pixel at the left end of the image.

Further, as another method, a frequency analysis is conducted based on image information to obtain pixel positions where a high frequency is generated. Since the pixel positions become an outline of portions other than the background, inside the outline is assumed to be the portions other than the background. Further, as still another method, a range of a predetermined size from the center of an image is prescribed, and inside the range is assumed to be portions other than the background.

The region determination unit 121 performs above-described processing on any one of the image before color adjustment and the image after color adjustment, to determine a region from which image information is to be extracted.

The image information extraction unit 122 extracts image information pieces from within a region of one of the image before color adjustment and the image after color adjustment, which is designated by the region determination unit 121, and from within a region of the other image corresponding thereto. This can also be said that, as the image information pair at the positions corresponding to each other in the images, image information is extracted from the image before color adjustment and image information is extracted from the image after color adjustment.

In other words, from the image before color adjustment and the image after color adjustment, at the positions in these images, image information before color adjustment and image information after color adjustment are extracted.

Figure 4A:
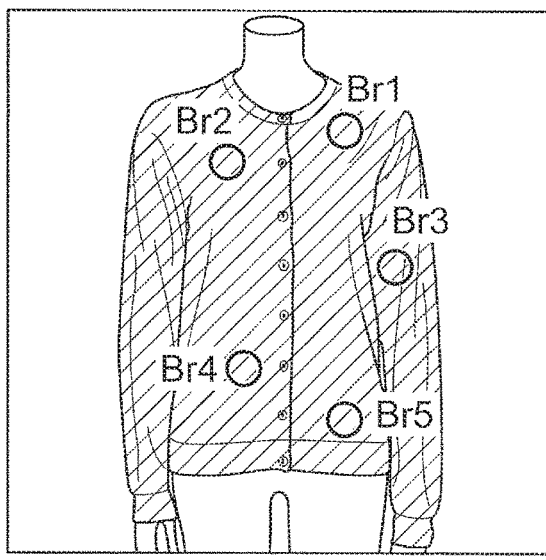
FIGS. 4A and 4B are diagrams showing an example of pairs of image information before color adjustment and image information after color adjustment.
Figure 4B:
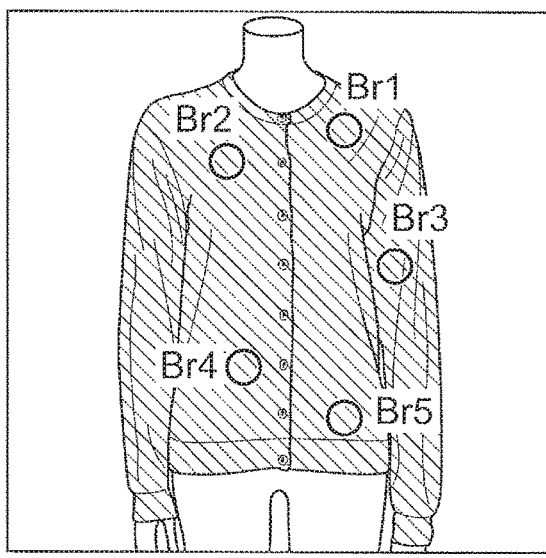

FIGS. 4A and 4B are diagrams showing an example of pairs of image information before color adjustment and image information after color adjustment.

Here, FIG. 4A shows an example of an image information before color adjustment and image information before color adjustment extracted from the image. Here, the image before color adjustment is an image of a blouse, and image information pieces extracted at locations indicated by Br1 to Br5 inside the image are indicated as RGBa1 to RGBa5. In this case, the blouse is in a solid blue color, and any of RGBa1 to RGBa5 is RGB data indicating the blue color.

Moreover, FIG. 4B shows an example of an image information after color adjustment and image information after color adjustment extracted from the image. Here, image information pieces extracted at locations indicated by Br1 to Br5, which are similar to those in FIG. 4A, are indicated as RGBb1 to RGBb5.

In the image information obtaining unit 12, by the method as described above, the image information before color conversion and the image information after color conversion corresponding thereto are obtained as image information pairs. The obtained image information pairs are stored in the image information memory 123.

The accuracy derivation unit 124 calculates the accuracy with respect to plural image information pairs extracted in the image information extraction unit 122.

The accuracy derivation unit 124 calculates the accuracy based on a color conversion vector with image information before color conversion as a starting point and image information after color conversion as an ending point.

Figure 5A:
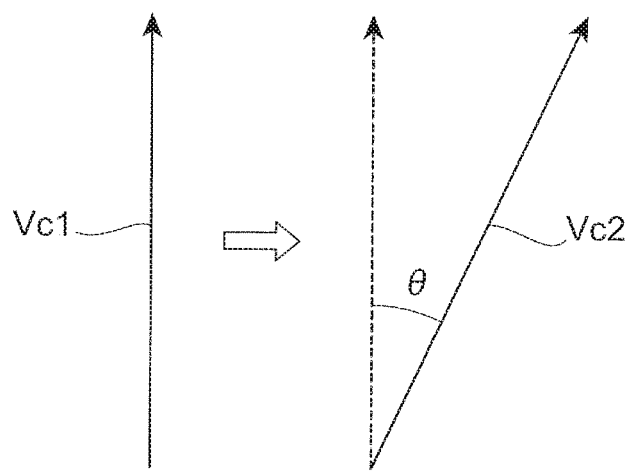
FIGS. 5A and 5B are diagrams showing methods of obtaining accuracy from color conversion vectors.
Figure 5B:
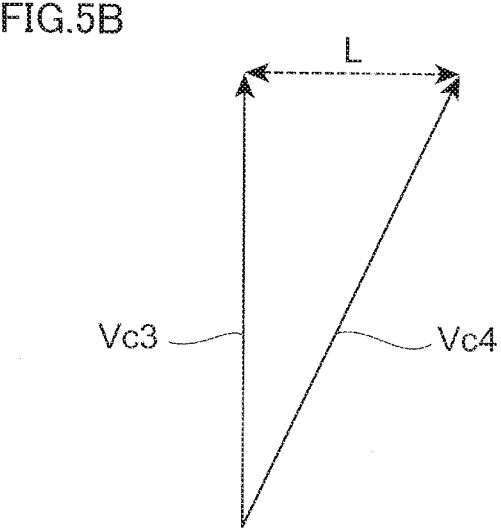

FIGS. 5A and 5B are diagrams showing methods of obtaining the accuracy from color conversion vectors.

Of these, FIG. 5A shows a case in which the accuracy is derived from an angle between plural color conversion vectors.

In the shown example, as the color conversion vectors, two vectors, a color conversion vector Vc1 and a color conversion vector Vc2, are shown. The starting points of these color conversion vectors Vc1 and Vc2 are, as described above, the image information before color conversion (color values), and the ending points mean the image information after color conversion (color values). In other words, the color conversion vectors Vc1 and Vc2 indicate a moving direction and a moving amount of image information by the color conversion. Then, let us consider the angle θ between the color conversion vector Vc1 and the color conversion vector Vc2. When, in a specific color region, there is united directionality and integrity in color adjustment, the plural color conversion vectors are in the same direction; therefore, the angle θ is more likely to approach zero. In contrast thereto, when the directionality is not united and the integrity is poor in color adjustment, directions of the plural color conversion vectors are less prone to be the same; therefore, the angle θ is more likely to be increased. In other words, when the accuracy with respect to the plural image information pairs obtained in the image information obtaining unit 12 is high, the angle θ between the plural color conversion vectors is more likely to be reduced, whereas, when the accuracy is not high, the angle θ between the plural color conversion vectors is more likely to be increased. Accordingly, the above-described accuracy can be derived from the angle θ between the plural color conversion vectors.

Moreover, FIG. 5B shows a case in which the accuracy is derived from a color difference between ending points of plural color conversion vectors.

In the shown example, as the color conversion vector, a color conversion vector Vc3 is shown. Moreover, for the image information of the image before color conversion and the image information after color conversion used as the color conversion vector Vc4, learning data, which will be described later, may be used or non-learning data may be used. Then, let us consider a difference (color difference) L between the image information at the ending point of the color conversion vector Vc3 and the image information after color conversion applied to the image information of the image before the color conversion and serving as the starting point based on the color conversion property. Here, let us consider the difference (color difference) L between the image information pieces at the ending points of the color conversion vector Vc3 and the color conversion vector Vc4. Note that the color difference L can also be considered to be the Euclidean distance in the color space representing the image information (for example, RGB color space). When, in a specific color region, there is aligned directionality and integrity in color adjustment, these color conversion vectors Vc3 and Vc4 are in the same direction and in the same magnitude; therefore, the positions of the ending points are unlikely to be varied. As a result, the color difference L is more likely to be reduced. In contrast thereto, when the directionality is not aligned and the integrity is poor in color adjustment, directions and magnitudes of these color conversion vectors Vc3 Vc4 are less prone to be the same, and therefore, the positions of the ending points are likely to be varied. As a result, the color difference L is more likely to be increased. In other words, when the accuracy with respect to the plural image information pairs obtained in the image information obtaining unit 12 is high, the color difference between the ending points of these color conversion vectors Vc3 and Vc4 is more likely to be reduced, whereas, when the accuracy is not high, the color difference between the ending points of these color conversion vectors Vc3 and Vc4 is more likely to be increased. Accordingly, the above-described accuracy can be derived from the color difference between the ending points of these color conversion vectors Vc3 and Vc4.

Note that the image information obtaining unit 12 can exclude a color conversion vector having an angle or a color difference significantly different from those of other color conversion vectors. That is, it is possible to exclude image information pairs generating such color conversion vectors. In other words, the color adjustment causing such image information pairs has directionality of color adjustment that is apparently different; accordingly, it is inappropriate to derive accuracy or to create a highly accurate color conversion model. Therefore, the image information obtaining unit 12 can also exclude such image information pairs from the image information pairs. To determine whether or not a color conversion vector has an angle or a color difference significantly different from those of other color conversion vectors, existing statistical methods can be used.

Moreover, the image information obtaining unit 12 can be grasped as an accuracy output unit that outputs accuracy of a color conversion property from plural image information pairs accepted by the first image obtaining unit 11 or the third image obtaining unit 18.

The first accuracy evaluation display 13 creates accuracy information to display accuracy calculated in this manner. Control is performed to output and display the display information onto the display device 20.

Figure 6:
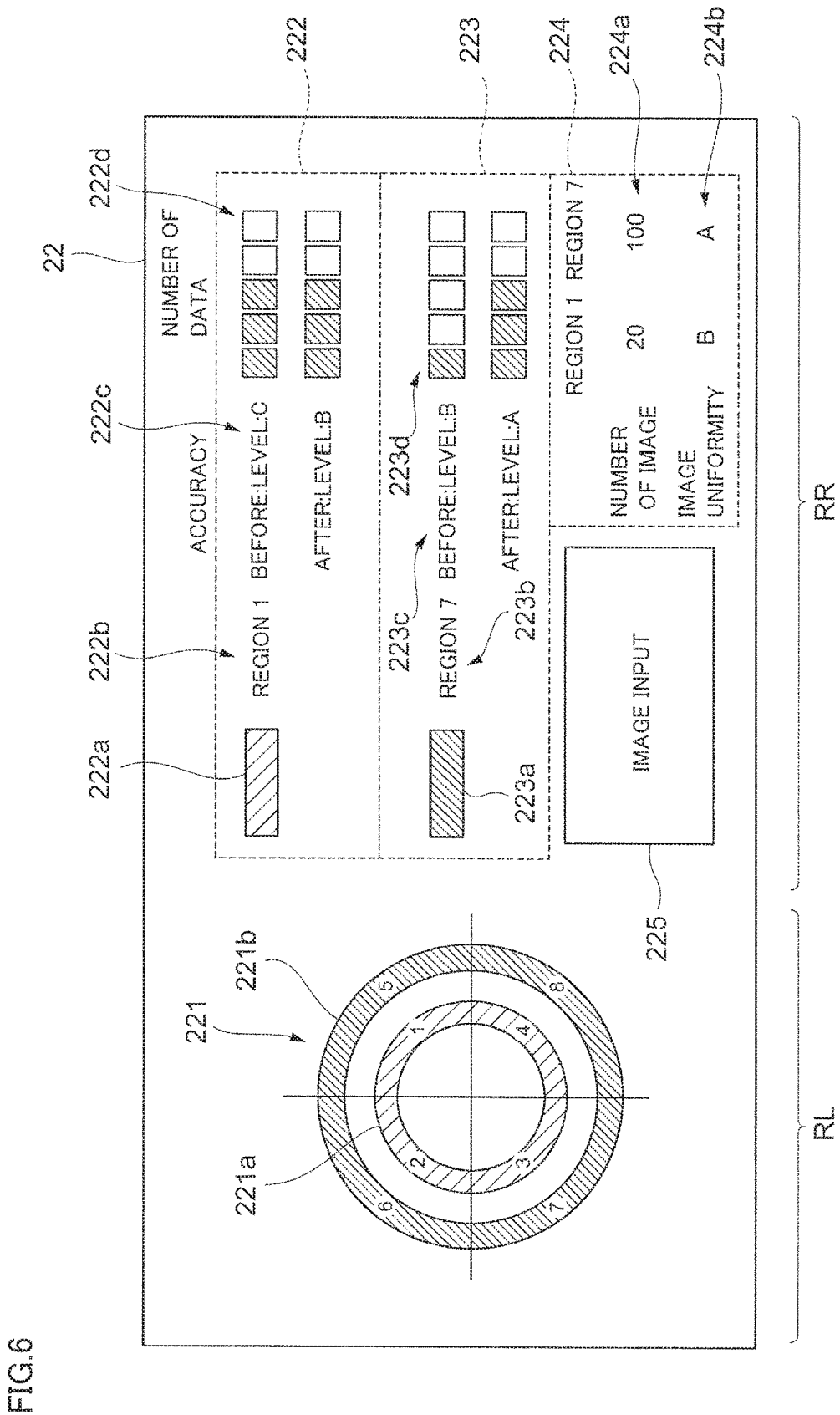
FIG. 6 is a diagram showing an example in which display information created by a first accuracy evaluation display unit is displayed on a display unit of the display device.

FIG. 6 is a diagram showing an example in which display information created by the first accuracy evaluation display 13 is displayed on the display 22 of the display device 20.

The shown example displays an entire color region 221 from which the accuracy is calculated in a left-side area RL. Here, the entire color region 221 is displayed by two annular rings 221a and 221b.

In the example shown in FIG. 6, the entire color region 221 is divided into eight color regions, the region 1 to the region 8. Note that "color region" refers to each of the regions when a color space is divided by a predetermined method. Here, an entire color space to be used is divided by a predetermined rule, and each of the divided regions is assumed to be a color region. More specifically, predetermined boundary values are provided to hue, saturation and brightness, and thereby the divided regions can be set as the respective regions. In FIG. 6, as an example of this, regions divided based on hue and saturation are set as the respective regions.

Then, in the exemplary embodiments, the first accuracy evaluation display 13 calculates the accuracy for each of the color regions.

In the example shown in FIG. 6, numerals 1 to 4 are displayed on the inside annular ring 221a, which indicate that the accuracy is calculated in the region 1 to the region 4 of the entire color region 221. Moreover, numerals 5 to 8 are displayed on the outside annular ring 221b, which indicate that the accuracy is calculated in the region 5 to the region 8 of the entire color region 221. Moreover, each of the region 1 to the region 8 is painted by actual color in the region. Consequently, the two annular rings 221a and 221b represents a color region by combining the accuracy displayed in each region.

Moreover, in the shown example, in a right-side area RR, information including the accuracy in the regions 1 and 7 of the entire color region 221 is displayed.

In the right-side area RR, in an area 222, information about a color region with low accuracy is displayed. Here, it is assumed that the accuracy is low in the region 1.

In the area 222, the color in the region 1 is displayed as a color sample 222a, and "region 1" is displayed as region information 222b indicating information related to the region 1. Further, in the area 222, the accuracy 222c of plural pairs of image information is displayed, and a sufficiency level of image information pairs is displayed as a number of data items 222d. This "sufficiency level" is a ratio of image information pairs actually inputted by the first image obtaining unit 11 to the required image information pairs. There are some cases in which "sufficiency level" is determined across the board for each of the color regions and some other cases in which "sufficiency level" is individually determined for each of the color regions. In the exemplary embodiments, the sufficiency level is determined by a method that individually determines the level for each of the color regions.

Of these, the accuracy 222c is displayed as "Level", including five levels of A, B, C, D and E. In this case, the highest accuracy is A and the lowest accuracy is E. Moreover, here, the accuracy 222c is displayed for two cases, "Before" and "After". The case "Before" is the accuracy of plural pairs of image information related to the first image, and, here, it is indicated that the Level is C. Moreover, though details will be described later, "After" is the accuracy of plural pairs of image information after the third image, which is an additional image, is added, and, here it is indicated that the Level is B. In other words, here, it can also be said that the accuracy of the color conversion property before and after new image information pairs (the third image) are added is displayed on the display device 20.

Moreover, the number of data items 222d is displayed by a number of colored boxes in five levels. In other words, it is indicated that, the less the number of colored boxes is, the lower the sufficiency level of the number of image information pairs is, whereas, the more the number of colored boxes is, the higher the sufficiency level of the number of image information pairs is. Moreover, here, the number of data items 222d is also displayed for two cases, "Before" and "After". The case "Before" is the sufficiency level of the number of image information pairs related to the first image, and, here, it is indicated that the number of data items 222d is on the third level in the five levels. Moreover, though details will be described later, "After" is the sufficiency level of the number of image information pairs after the third image, which is an additional image, is added, and, here it is indicated that the number of data items 222d is on the third level in the five levels.

Moreover, in the area 223, for comparison with the low-accuracy region 1, information about a high-accuracy color region is displayed. Here, it is assumed that the accuracy is high in the region 7.

In the area 223, information similar to that in the area 222 is displayed for the region 7. In other words, in the area 223, the color in the region 7 is displayed as a color sample 223a, and region information 223b indicating information related to the region 7 is displayed. Further, in the area 223, the accuracy 223c of plural pairs of image information is displayed, and the sufficiency level of image information pairs is displayed as a number of data items 223d.

As described above, in the display 22, the accuracy is displayed for each color region. Here, in the areas 222 and 223, the regions 1 and 7 are selected from the color regions, the region 1 to the region 8, to thereby display the accuracies 222c and 223c. Moreover, in the display 22, the accuracies are respectively displayed before and after the image information of the third image, which obtains additional image information pairs, is obtained. Here, in the areas 222 and 223, this is performed by displaying "Before" and "After" in the accuracies 222c and 223c, respectively.

Moreover, in the display 22, the sufficiency level of the image information pairs required to create the color conversion model is displayed. Here, in the areas 222 and 223, as the sufficiency level of required the image information pairs, the number of data items 222d and 223d are displayed. Moreover, in the display 22, the sufficiency levels of the image information pairs are respectively displayed before and after the image information of the third image, which obtains additional image information pairs, is obtained. Here, in the areas 222 and 223, this is performed by displaying "Before" and "After" in the number of data items 222d and 223d, respectively.

Then, in the area 224, as to each of the region 1 and the region 7, the obtained number of image information pairs is displayed as the number of images of the first image 224a. Here, it is indicated that the number of images of the first image 224a in the region 1 is 20 and the number of images of the first image 224a in the region 7 is 100.

Further, in the area 224, as to each of the region 1 and the region 7, the degree of variation of the color conversion vectors is displayed as image uniformity 224b. Here, the image uniformity 224b is displayed, for example, in five levels of A, B, C, D, E from good to bad. It is indicated that the image uniformity 224b in the region 1 is B and the image uniformity 224b in the region 7 is A.

Further, a button 225 is selected by a user when the above-described third image is inputted.

Returning to FIG. 2, the second image obtaining unit 14 obtains image information of a second image by which a user confirms accuracy. The second image is an image for evaluation by which the user confirms accuracy. Moreover, here, similar to the first image, the second image includes pairs each being composed of an image before color adjustment and an image after color adjustment. Consequently, similar to the first image obtaining unit 11, the second image obtaining unit 14 functions as an acceptance unit that accepts image information pairs each being composed of image information before color conversion and image information after color conversion.

The second accuracy evaluation display 15 performs, regarding the second image, control to further create display information for displaying an image before color conversion and an image after color conversion based on a color conversion model. Then, the display 22 displays the information. In other words, here, a tentative color conversion model is created based on the image information pairs obtained in the first image obtaining unit 11, and a result of color adjustment that can be performed by use of the color conversion model is assumed to be an image after color conversion, and displayed on the display 22. The user confirms the above-described accuracy by observing the image.

Figure 7:
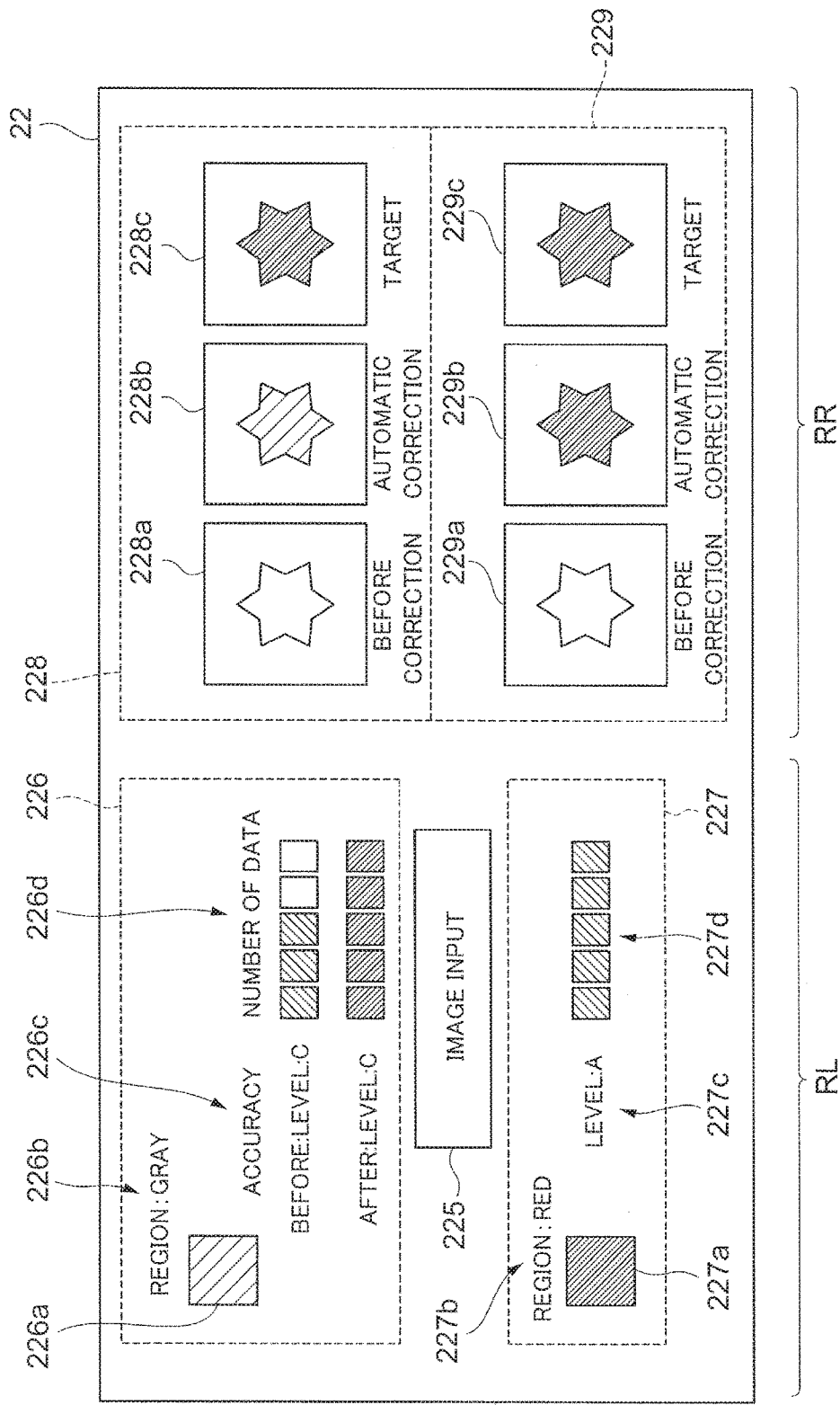
FIG. 7 is a diagram showing a first example in which display information created by a second accuracy evaluation display unit is displayed on the display unit of the display device.

FIG. 7 is a diagram showing a first example in which display information created by the second accuracy evaluation display 15 is displayed on the display 22 of the display device 20.

In FIG. 7, "color region" is determined to be a specific color. The specific color is not particularly limited, and is determined in accordance with a user's purpose. In this case, the determined color region may not cover the entire color space to be used, but may cover only a part thereof. For example, when color adjustment is performed only for a beige color, the solid beige color may be determined as the color region. Moreover, for example, when color adjustment is performed only for metal parts, a solid metallic color may be determined as the color region. Of course, plural color regions may be determined. In FIG. 7, as an example, it is assumed that six color regions of red, white, gray, beige, blue and yellow are determined.

In the exemplary embodiments, the second accuracy evaluation display 15 also calculates the accuracy for each of the color regions.

The shown example displays, from among the entire color region, a color region, for which an image for confirming accuracy is displayed, in the left-side area RL. Here, in the area 226, the color in the color region of gray is displayed as a color sample 226a, and "region: gray" is displayed as region information 226b indicating information related to the color region of gray. Further, in the area 226, the accuracy 226c of plural pairs of image information is displayed, and the sufficiency level of image information pairs is displayed as the number of data items 226d.

Moreover, similar to the case shown in FIG. 6, the accuracy 226c is displayed as "Level", and is displayed for two cases, "Before" and "After". Here, it is indicated that "Level" is C in both cases. Moreover, similar to the case shown in FIG. 6, the number of data items 226d is displayed by a number of colored boxes in five levels, and is displayed for two cases, "Before" and "After". It is indicated that, as to "Before", the number of data items 226d is on the third level in the five levels, and as to "After", the fifth level in the five levels.

Moreover, here, in the area 227, the accuracy of the high-accuracy region is displayed for comparison. Here, the color in the region of red is displayed as a color sample 227a, and "region: red" is displayed as region information 227b indicating information related to the region of red. Then, as the accuracy 227c, it is indicated that "Level" in the region of red is A. Further, it is indicated that the number of data items 227d is on the fifth level in the five levels.

Note that, in the left-side area RL, the button 225 having the function similar to the case shown in FIG. 6 is displayed.

Moreover, in the shown example, in an area 228 of the right-side area RR, an image for confirming the accuracy by a user in the color region of gray is displayed. Here, of the second image obtained in the second image obtaining unit 14, the image before color adjustment is displayed as an image "before correction" 228a. Moreover, of the second image obtained in the second image obtaining unit 14, the image after color adjustment is displayed as a "target" image 228c. Then, between the image 228a and the image 228c, a result of color adjustment that can be performed by use of a tentative color conversion model is displayed as an image of "automatic correction" 228b.

Moreover, in the area 229 of the right-side area RR, an image for confirming the accuracy by a user in the color region of red is displayed. The image displayed in the area 229 is displayed by a method similar to that in the area 228. In other words, of the second image obtained in the second image obtaining unit 14, the image before color adjustment is displayed as an image "before correction" 229a. Moreover, of the second image obtained in the second image obtaining unit 14, the image after color adjustment is displayed as a "target" image 229c. Then, between the image 229a and the image 229c, a result of color adjustment that can be performed by use of a tentative color conversion model is displayed as an image of "automatic correction" 229b.

The user compares the image 228b and the image 228c in the area 228, and thereby, it is possible to determine the accuracy of the above-described tentative color conversion model. Similarly, the user compares the image 229b and the image 229c in the area 229, and thereby, it is possible to do the same. However, the area 228 displays a comparison in the case of the low accuracy, whereas, the area 229 displays a comparison in the case of the high accuracy. Therefore, by comparing the area 228 with the area 229, the user can also compare the low-accuracy case and the high-accuracy case.

Note that, since the accuracy of the tentative color conversion model and the accuracy of plural pairs of image information are related to each other, it can be considered that these indicate the accuracy of the plural pairs of image information.

Note that, here, the second image is pairs of the image before color adjustment and the image after color adjustment; however, it may be possible to omit the image after color adjustment, and to leave only the image before color adjustment. In this case, "target" images 228c and 229c, which are the images after color adjustment, are not displayed. In this case, the images 228a and 228b in the area 228 and the images 229a and 229b in the area 229 are compared in each area, to thereby determine the accuracy of the tentative color conversion model.

FIG. 8A is a diagram showing a second example in which display information created by the second accuracy evaluation display 15 is displayed on the display 22 of the display device 20.

In the shown example, in the area 226 of the left-side area RL, an image similar to that in the area 226 in FIG. 7 is displayed. In other words, as to the color region of gray, the color sample 226a, the region information 226b, the accuracy 226c and the number of data items 226d are displayed.

Moreover, in the left-side area RL, the button 225 having the function similar to the button 225 shown in FIG. 7 is displayed.

Moreover, in the area 230 of the right-side area RR, an image for confirming the accuracy by a user in the color region of gray is displayed. Then, similar to the case of FIG. 7, the image before color adjustment is displayed as an image "before correction" 230a. On the other hand, here, the result of color adjustment before the third image is added is displayed as an image 230b of "Learning 1", and the result of color adjustment after the third image is added is displayed as an image 230c of "Learning 2". In other words, it can be considered that the image 230b and the image 230c correspond to "Before" and "After" of the accuracy 226c.

Note that, here, images of the area 227 and the area 229 in FIG. 7 are not displayed; however, the same images as those may also be displayed in the case of FIG. 8A. Moreover, portions displaying the images in the areas 228 and 229 in FIG. 7 or the areas 230 and 232 in FIG. 8A may display diagrams (or fills) of RGB values, not the images.

FIG. 8B is a diagram showing a third example in which display information created by the second accuracy evaluation display 15 is displayed on the display 22 of the display device 20.

The shown example indicates an example in which an image, by which a user confirms accuracy as to an entire color region, is displayed. Here, in the area 231 of the left-side area RL, the accuracy 231c and the number of data items 231d are displayed.

The accuracy 231c is also displayed here as "Level", including five levels of A, B, C, D and E. Moreover, here, two sets of the third image, which is the additional image, are prepared and assumed to be "Learning 1" and "Learning 2", for each of which the accuracy 231c is displayed. In this case, as the accuracy of "Learning 1", it is indicated that "Level" is A. Moreover, as the accuracy of "Learning 2", it is indicated that "level" is C.

The number of data items 231d is, similar to the case shown in FIG. 7, displayed by the number of colored boxes in five levels, and is displayed for two cases, "Learning 1" and "Learning 2". Here, it is indicated that, as to "Learning 1", the number of data items 231d is on the fourth level in the five levels, and as to "Learning 2", the fifth level in the five levels.

Moreover, here, in the area 232 of the right-side area RR, an image for confirming the accuracy in the entire color region by a user is displayed. Then, similar to the case of FIG. 8A, the image before color adjustment is displayed as an image "before correction" 232a. Moreover, here, as the images for confirming the accuracy of the prepared two sets of the third image, an image 232b of "Learning 1" and an image 232c of "Learning 2" are displayed. In other words, it can be considered that the image 232b and the image 232c correspond to "Learning 1" and "Learning 2" of the accuracy 231c. Moreover, here, an image 232d of "Target", which is an image after color adjustment, is displayed; therefore, it is possible to compare and determine which one of the image 232b of "Learning 1" and the image 232c of "Learning 2" is closer to the image 232d of "Target". Further, as a result of the comparison, the user can select any one of "Learning 1" and "Learning 2" as the learning to be used.

A button 233 is used when the user selects any one of "Learning 1" and "Learning 2".

FIG. 9 is a diagram showing a fourth example in which display information created by the second accuracy evaluation display 15 is displayed on the display 22 of the display device 20.

Here, a case where accuracies in red, white, gray, beige, blue and yellow, which are set as the color regions, are displayed in a list is shown.

Here, in the left-side area RL, the colors of the respective color regions are displayed as color samples 234a, and names of the respective color regions are displayed as region information items 234b.

Further, in the right-side area RR, the accuracies 234c are displayed. The accuracy 234c is displayed as "Level", and display is performed, not by the number of boxes, but by numerals of 1, 2, 3, 4, 5 in five levels. In this case, the highest accuracy is 5 and the lowest accuracy is 1. Then, "Level" before the third image is added is displayed as "Learning (initial)", and "Level" after the third image is added is displayed as "Re-learning".

The first accuracy evaluation display 13 and the second accuracy evaluation display 15 can be grasped as a display information creation unit that, when the color conversion model that converts the image information of an image before color conversion into the image information of the image after color conversion is created, creates display information that displays accuracy of plural image information pairs. Moreover, the first accuracy evaluation display 13 and the second accuracy evaluation display 15 can be grasped as a display control unit that controls to display the accuracy outputted by the image information obtaining unit 12 for each of the color regions on the display device 20. Further, the second accuracy evaluation display 15 can be grasped as a display control unit that, when the second image obtaining unit 14 accepts new image information pairs (the second image), controls to display, on the display device 20, at least image information created by color conversion of the image information of the new image information pairs (the second image) before color conversion based on the color conversion property (color conversion model) created by the color conversion coefficient calculation unit 19 from the image information pairs having already been accepted by the first image obtaining unit 11 and image information of the image information pairs (the second image) after color conversion.

When an image is displayed on the display 22 based on the display information of the second image, the user's evaluation acceptance unit 16 accepts user's evaluation about color conversion by the color conversion model.

In other words, when the user observes the images in the area 228 and the area 229 in FIG. 7, evaluation whether or not the accuracy of the above-described tentative color conversion model can be allowed is accepted. At this time, the display 22 displays the user's evaluation acceptance screen that accepts user's evaluation of color conversion by the color conversion model, as a result of displaying the second image.

Figure 10:
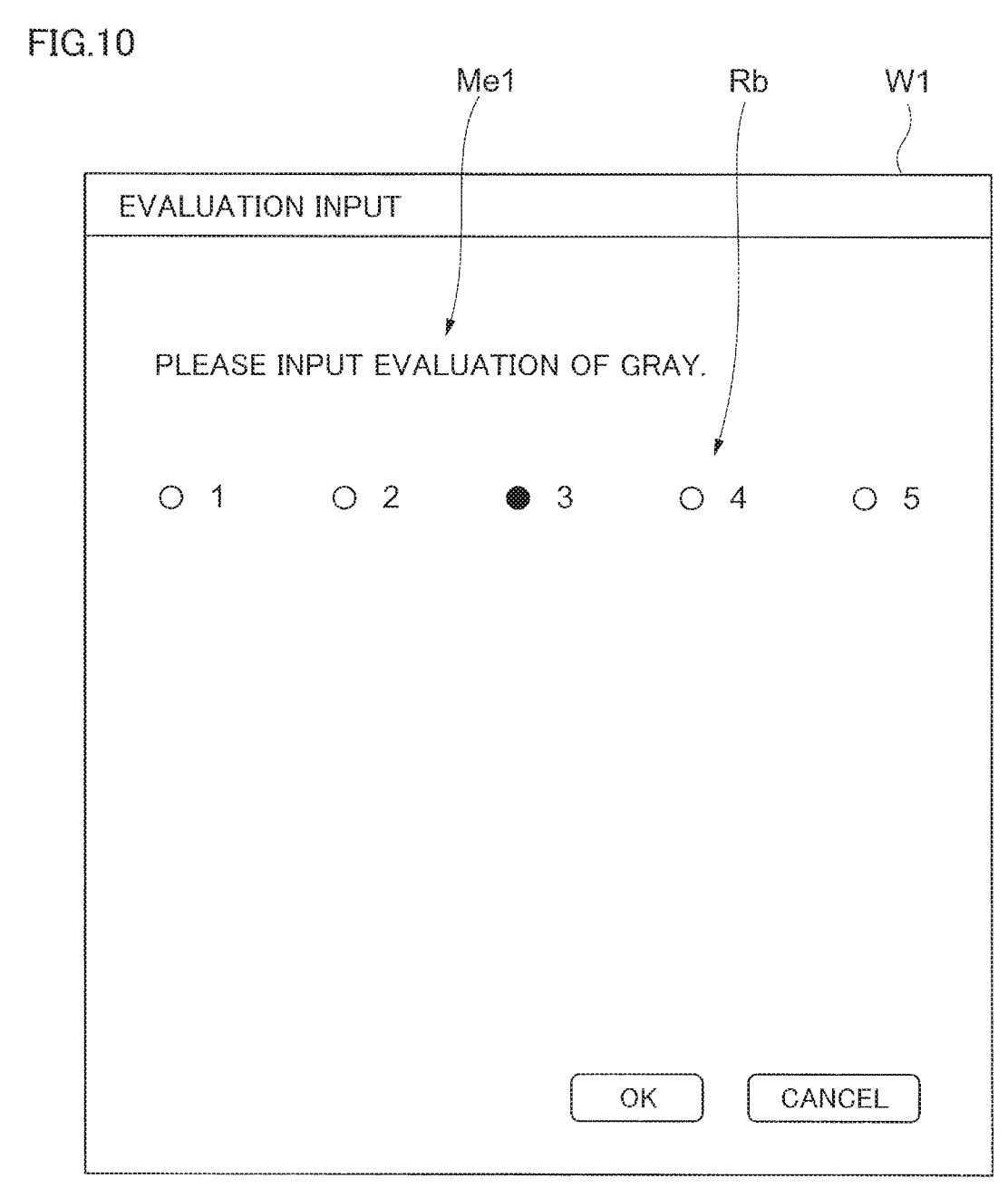

FIG. 10 is a diagram showing an example in which the user's evaluation acceptance screen is displayed on the display 22.

The shown example indicates the user's evaluation acceptance screen displayed as a window W1 on the display 22.

Here, a case, in which evaluation of the color region of gray in FIG. 7 is inputted, is shown. In other words, a case, in which a user compares the images 228a to 228c with one another in the area 228 in FIG. 7, and evaluation thereby is inputted, is shown. Then, on the window W1, the message Me1 is displayed, "Please input evaluation of gray." and the user can input evaluation in five levels of 1, 2, 3, 4, 5 from the window W1. In this case, the lowest evaluation is 1 and the highest evaluation is 5. Then, by selecting one of radio buttons Rb adjacent to the respective numerical values 1 to 5, the user can input evaluation of any one of 1 to 5. Here, an example is shown in which the user selects a radio button Rb corresponding to 3 as the evaluation.

Note that, in FIG. 10, the five levels of 1 to 5 are set as the user's evaluation; however, the number of levels is not particularly limited. For example, two levels of "good" or "bad" can be set. Moreover, here, a case of inputting the user's evaluation of the color region of gray is shown; however, the user's evaluation may be inputted for other color regions. Further, it may be possible that the user inputs plural second images, and provides user's evaluation for each of the plural second images. Further, it may be possible to discriminate among the color regions included in the second image, determine a representative image in each of the color regions from the second image and display thereof in the area 228 or the area 229 in FIG. 7, and input user's evaluation based thereon.

Further, evaluation may be performed by selecting one by the user from the images for confirming the accuracy of the prepared plural sets of the third image as shown in FIG. 8. Consequently, it can be said that the screen shown in FIG. 8 is the user's evaluation acceptance screen.

When the image information pairs are insufficient, the additional information deriving unit 17 obtains color regions required for image information pairs to be added. In other words, the additional information deriving unit 17 obtains the color regions required for the third image including pairs each being composed of the image before color adjustment and the image after color adjustment. At this time, the additional information deriving unit 17 creates display information that displays an additional information screen for displaying the color region required for image information pairs to be added. Then, the display 22 displays the additional information screen.

Moreover, the additional information deriving unit 17 can further obtain the number of pairs necessary as the third image. In this case, the display 22 further displays the number of additional pairs necessary as the third image.

Figure 11:
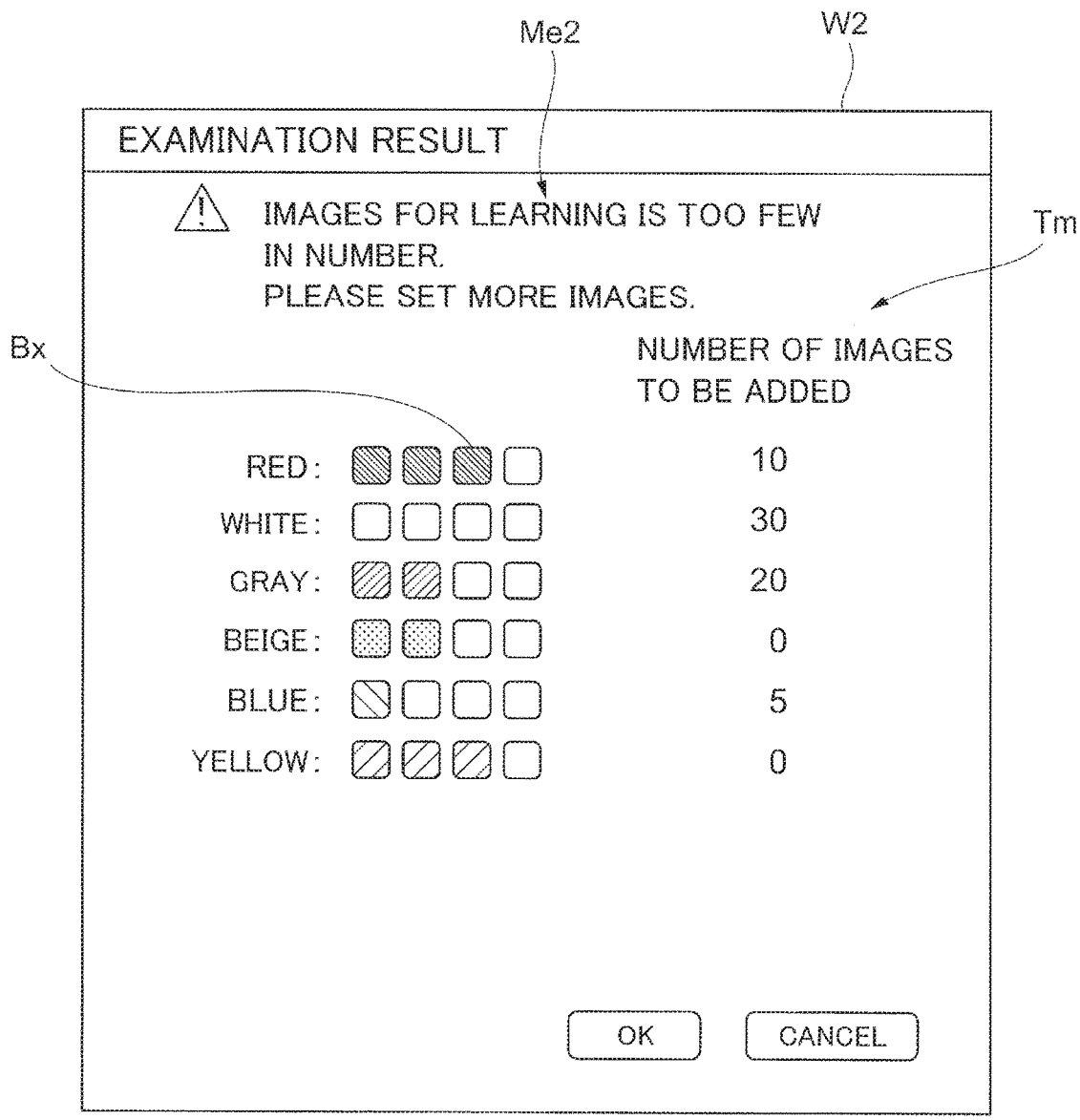
FIG. 11 is a diagram showing an example in which an additional information screen is displayed on a display unit.

FIG. 11 is a diagram showing an example in which the additional information screen is displayed on the display 22.

The shown example indicates the additional information screen displayed as a window W2 on the display 22. Then, on the window W2, the message Me2 is displayed, "Images for learning are too few in number. Please set more images."

Moreover, on the window W2, the sufficiency level of the image information pairs is displayed by a number of colored boxes Bx in four levels for each color region. In other words, it is indicated that, the less the number of colored boxes Bx is, the lower the sufficiency level of the number of image information pairs is, whereas, the more the number of colored boxes Bx is, the higher the sufficiency level of the number of image information pairs is. Further, on the window W2, the number of pairs to be added Tm is displayed for each color region.

It is possible to set the number of images necessary to each color region in advance, and to assume the number of pairs to be added Tm as a difference from the number of first images actually inputted. Moreover, the number of pairs to be added Tm may be increased or decreased by the above-described accuracy or user's evaluation, not simply by the difference in number. In other words, when the accuracy is high, the number of pairs to be added Tm is decreased. In contrast thereto, when the accuracy is low, the number of pairs to be added Tm is increased. Moreover, when the user's evaluation is high, the number of pairs to be added Tm is decreased. In contrast thereto, when the user's evaluation is low, the number of pairs to be added Tm is increased.

Here, an example, in which the boxes Bx and the number of pairs to be added are displayed for the six color regions of red, white, gray, beige, blue and yellow, is shown. Here, it is indicated that, as to the color regions of beige and yellow, the image information pairs are not insufficient, and thereby the number of pairs to be added is zero. Moreover, in each of the color regions of the other colors, the image information pairs are insufficient and the required number of images is displayed. For example, as to the color region of gray, it is displayed that the number of pairs to be added is 20. The user can grasp whether or not the third image, which is an additional image, is necessary by looking at the additional information screen. Further, the user can grasp in which color region insufficiency occurs, and, for example, the user can select an image including much color of the color region as the third image.

The third image obtaining unit 18 obtains image information of the third image. Consequently, similar to the first image obtaining unit 11 and the second image obtaining unit 14, the third image obtaining unit 18 functions as an acceptance unit that accepts image information pairs each being composed of image information before color conversion and image information after color conversion.

This makes it possible to, for example, when the user's evaluation accepted by the user's evaluation acceptance unit 16 is not higher than a predetermined criterion, obtain the image information pairs. At this time, the display 22 displays a third image obtaining screen for obtaining image information of the third image.

Examples of the third image obtaining screen include the screens shown in FIGS. 6 and 7 displaying the button 225 selected by the user when inputting the third image. Note that, other than this, a window for obtaining the third image may be displayed.

On the image information of the third image, processing similar to the processing on the image information of the first image is performed. In other words, in the image information obtaining unit 12, the region determination unit 121 determines a region from which the image information is extracted, and the image information extraction unit 122 extract the image information pairs. Then, the image information memory 123 stores the extracted image information pairs, and the accuracy derivation unit 124 calculates the accuracy of plural image information pairs. Note that the accuracy means accuracy of the plural pairs of image information after the third image is added to the image information of the first image. The calculated accuracy is displayed at the portion of "After" described in FIG. 6 or FIG. 7.

The color conversion coefficient calculation unit 19 creates the color conversion model. Consequently, the color conversion coefficient calculation unit 19 functions as a color conversion property creation unit that creates the color conversion property (color conversion model) from the plural image information pairs accepted by the first image obtaining unit 11. Further, the color conversion coefficient calculation unit 19 creates the conversion relationship, such as the three-dimensional LUT, based on the color conversion model.

The color conversion coefficient calculation unit 19 creates the color conversion model based on the pairs of image information before color adjustment and image information after color adjustment obtained from the first image or the third image. In other words, the color conversion model representing a relationship between the image information before color adjustment and the image information after color adjustment is created.

Figure 12:
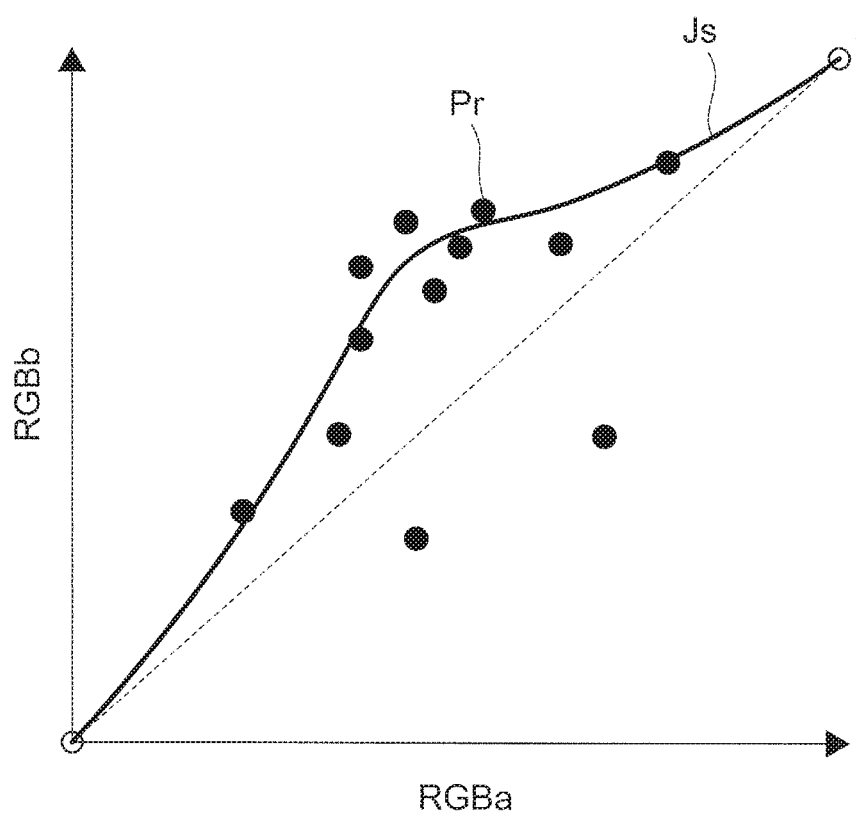
FIG. 12 is a diagram showing an example of a color conversion model.

FIG. 12 is a diagram showing an example of the color conversion model.

Here, the horizontal axis indicates the image information before color adjustment and the vertical axis indicates the image information after color adjustment. The image information before color adjustment and the image information after color adjustment are the RGB data; in FIG. 12, the image information before color adjustment is shown as RGBa, and the image information after color adjustment is shown as RGBb.

Black dots Pr indicate plotted image information before color adjustment and image information after color adjustment; here, it is indicated that there are 12 pairs of image information before color adjustment and image information after color adjustment.

Moreover, the solid line Js represents a color conversion model indicating a relationship between the image information before color adjustment and the image information after color adjustment, the color conversion model being created by the color conversion coefficient calculation unit 19. As mentioned above, it can be said that the color conversion model is a function representing the relationship between the image information before color adjustment and the image information after color adjustment, and supposing the function is f, the function can be expressed as RGBb=f(RGBa). The color conversion model can be created by a publicly known method. However, it is preferred that a method capable of highly fitting into non-linear characteristics, such as a weighting regression model or a neural network, is used. However, not being limited to the non-linear characteristics, linear characteristics using Matrix model may be adopted.

Modified Example

Next, a modified example in the exemplary embodiments will be described.

Figure 13:
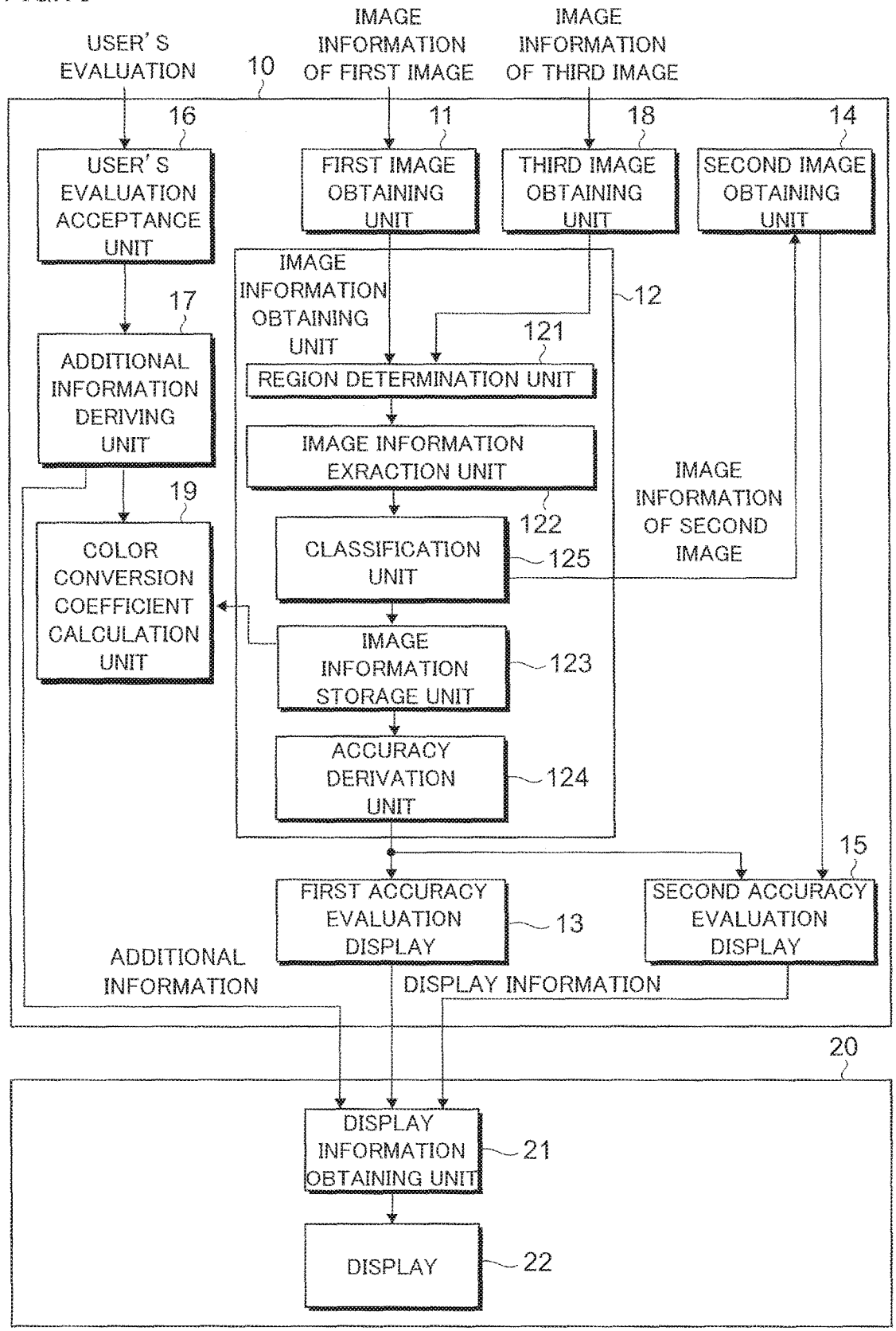
FIG. 13 is a block diagram showing a modified example of a functional configuration of the image processing device and the display device in the exemplary embodiment.

FIG. 13 is a block diagram showing a modified example of a functional configuration of the image processing device 10 and the display device 20 in the exemplary embodiments. Note that, in FIG. 13, of the various functions included in the image processing device 10 and the display device 20, those related to the exemplary embodiment are selected and shown.

In the image processing device 10 and the display device 20 in the exemplary embodiments shown in FIG. 13, in addition to the components shown in FIG. 2, a classification unit 125 is provided to the image information obtaining unit 12. Then, the second image obtaining unit 14 obtains image information of the second image from the classification unit 125. Moreover, others are similar to those shown in FIG. 2. In this case, functions of portions other than the classification unit 125 are similar to those in the case of FIG. 2. Consequently, hereinafter, the classification unit 125 will be mainly described.

The classification unit 125 classifies the image information pairs extracted in the image information extraction unit 122 into the learning data and the non-learning data. In this case, "learning data" is image information pairs used for creating the color conversion model. Moreover, "non-learning data" is image information pairs not used for creating the color conversion model. Then, the second accuracy evaluation display 15 assumes the non-learning data as the image information of the second image by which a user confirms accuracy. In other words, the image processing device 10 shown in FIG. 13 obtains the image information of the second image for evaluation from the image information of the first image.

To classify the image information pairs into the learning data and the non-learning data, in each of the color regions, the image information pairs are divided at a certain numeric ratio. For example, the ratio of the learning data and the non-learning data is set at 4:1 or 9:1 in advance, and the image information pairs are randomly divided into the learning data and the non-learning data in accordance with the ratio.

In this case, a user is not required to input the image information of the second image, and therefore, a burden of the user is reduced.

Next, operations of the image processing device 10 will be described.

First Exemplary Embodiment

In the first exemplary embodiment, as a first example of a minimum configuration, operations of the image processing device 10 displaying the screen shown in FIG. 7 will be described.

Figure 14:
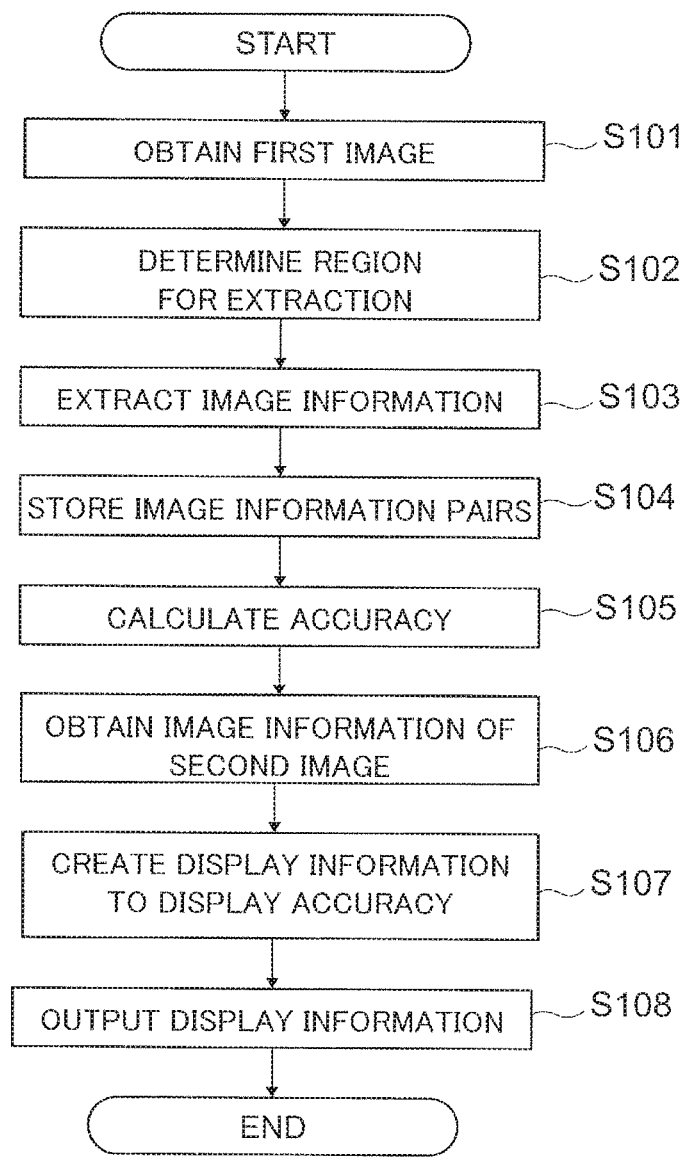
FIG. 14 is a flowchart illustrating operations of the image processing device in a first exemplary embodiment.

FIG. 14 is a flowchart illustrating operations of the image processing device 10 in the first exemplary embodiment.

To begin with, the first image obtaining unit 11 obtains image information of an original image before color adjustment and image information after color adjustment as a first image (step 101: a first image obtaining process and an acceptance process).

Next, the region determination unit 121 of the image information obtaining unit 12 determines, of any one of the image before color adjustment and the image after color adjustment, a region from which image information is to be extracted (step 102: an extraction region determining process).

Then, the image information extraction unit 122 extracts image information items from within a region of one of the image before color adjustment and the image after color adjustment, which is determined by the region determination unit 121, and from within a region of the other image corresponding thereto (step 103: an image information extraction process).

Further, the image information memory 123 stores the extracted image information pairs (step 104: an image information storage process).

Note that steps 102 to 104 can be grasped as an image information obtaining process that obtains, as to the first image, the image information before color conversion and the image information after color conversion corresponding thereto as an image information pair. Here, a case without the process of step 102 can be considered. When step 102 is not included, image information is extracted from the entire image.

Next, the accuracy derivation unit 124 calculates the accuracy with respect to the extracted plural pairs of image information (step 105: an accuracy derivation process and an accuracy output process). In other words, as described in FIG. 5A, the accuracy is derived from angles or color differences of the ending points between plural color conversion vectors. At this time, the accuracy derivation unit 124 calculates the accuracy for each of the color regions shown in FIG. 7. Moreover, as described above, at this time, the image information obtaining unit 12 can also exclude a color conversion vector having an angle or a color difference significantly different from those of other color conversion vectors.

Further, the second image obtaining unit 14 obtains image information of the second image for evaluation (step 106: a second image obtaining process and the acceptance process).

Then, the second accuracy evaluation display 15 creates display information to display the calculated accuracy (step 107: a display information creation process). Specifically, the second accuracy evaluation display 15 creates display information to display the screen as shown in FIG. 7.

Further, the second accuracy evaluation display 15 outputs the created display information to the display device 20 (step 108: a display information output process and a display control process).

As a result, on the display 22 of the display device 20, the screen shown in FIG. 7 is displayed.

Second Exemplary Embodiment

In the second exemplary embodiment, as a second example of the minimum configuration, operations of the image processing device 10 in the modified example will be described.

Figure 15:
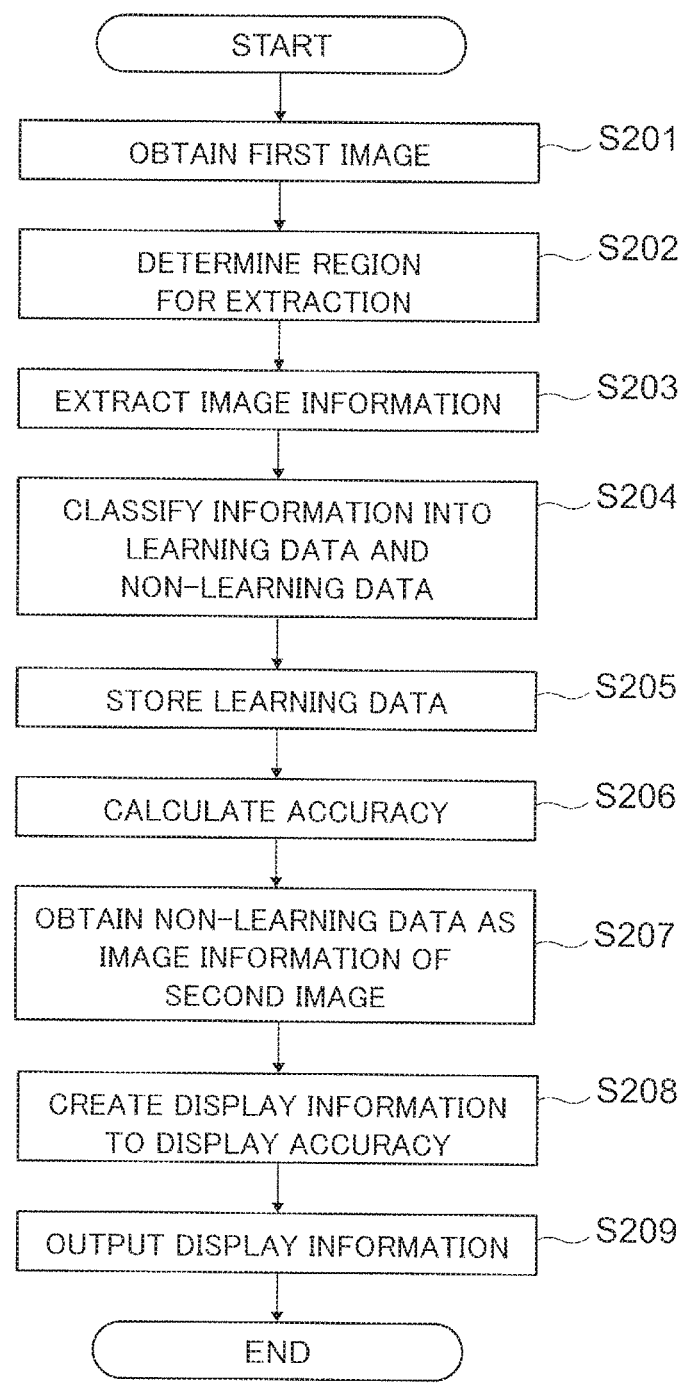
FIG. 15 is a flowchart illustrating operations of the image processing device in a second exemplary embodiment.

FIG. 15 is a flowchart illustrating the operations of the image processing device 10 in the second exemplary embodiment.

In FIG. 15, since steps 201 to 203 are similar to steps 101 to 103, descriptions thereof will be omitted.

After step 203, the classification unit 125 classifies the image information pairs extracted in the image information extraction unit 122 into the learning data and the non-learning data (step 204).

Then, the image information memory 123 stores the learning data (step 205: a learning data storage process).

Note that steps 202 to 205 can be grasped as an image information obtaining process that obtains, as to the first image, the image information before color conversion and the image information after color conversion corresponding thereto as an image information pair.

Next, the accuracy derivation unit 124 calculates the accuracy with respect to the extracted plural pairs of image information (step 206: the accuracy derivation process and the accuracy output process).

Then, the second image obtaining unit 14 obtains the non-learning data as image information of the second image for evaluation (step 207: a second image obtaining process and the acceptance process).

Since the following steps 208 to 209 are similar to steps 107 to 108, descriptions thereof will be omitted.

Third Exemplary Embodiment

In the third exemplary embodiment, a description will be given of a case in which, in addition to the first exemplary embodiment, the user's evaluation is accepted and the image information of the third image, which is the additional image, is obtained to create the conversion relationship.

Figure 16:
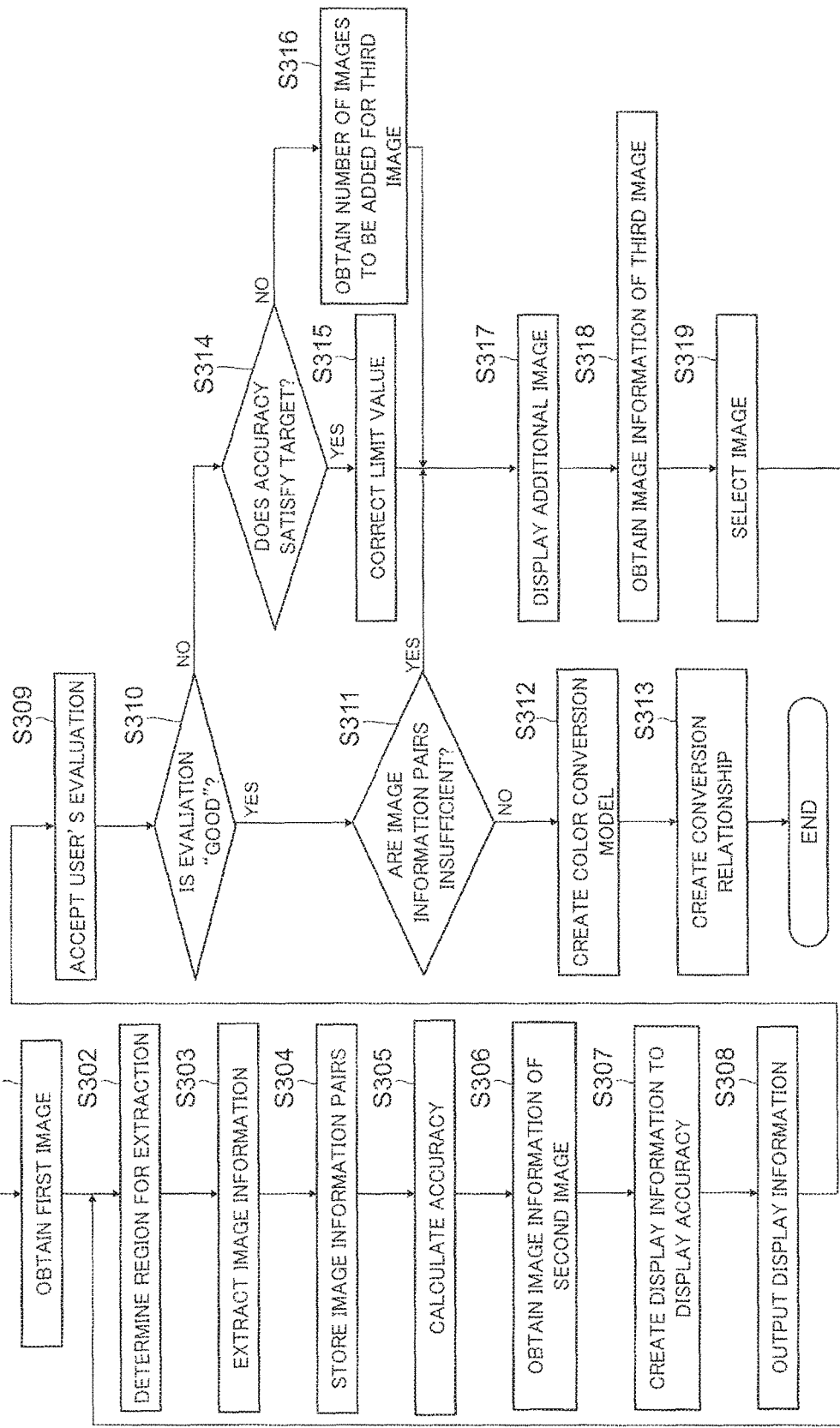
FIG. 16 is a flowchart illustrating operations of the image processing device in a third exemplary embodiment.

FIG. 16 is a flowchart illustrating the operations of the image processing device 10 in the third exemplary embodiment.

In FIG. 16, since steps 301 to 308 are similar to steps 101 to 108, descriptions thereof will be omitted.

After step 308, the user looked at the screen in FIG. 7 inputs evaluation to, for example, the user's evaluation acceptance screen shown in FIG. 8. Then, the user's evaluation acceptance unit 16 accepts the inputted user's evaluation (step 309: a user's evaluation acceptance process). Here, it is assumed that user's evaluation is provided in two levels of "good" or "bad".

Next, the user's evaluation acceptance unit 16 determines whether or not the user's evaluation is "good" (step 310: evaluation determination process).

As a result, when the user's evaluation is "good" (Yes in step 310), the additional information deriving unit 17 determines whether or not the obtained image information pairs are insufficient (step 311: insufficiency determination process).

When the image information pairs are not insufficient (No in step 311), the color conversion coefficient calculation unit 19 creates the color conversion model (step 312: a color conversion model creation process and a color conversion property creation process). Still further, the color conversion coefficient calculation unit 19 creates the conversion relationship, such as the three-dimensional LUT, based on the color conversion model (step 313: a conversion relationship creation process).

In other words, in the exemplary embodiment, when the user's evaluation accepted by the user's evaluation acceptance unit 16 exceeds a predetermined criterion (in this case, user's evaluation is "good") and the image information pairs suffice the required number, the color conversion model is created.

In contrast thereto, when there is insufficiency in step 311 (Yes in step 311), the process proceeds to step 317.

Moreover, when the user's evaluation is "bad" in step 310 (No in step 310), the additional information deriving unit 17 determines whether or not the accuracy obtained in step 305 satisfies a target (step 314: an accuracy determination process). The additional information deriving unit 17 provides a predetermined limit value with respect to the accuracy, and, based on the limit value, determines whether or not the accuracy satisfies the target.

As a result, when the accuracy satisfies the target (Yes in step 314), the limit value is corrected (step 315: a limit value correction process). That is, in this case, in spite of the fact that the accuracy satisfies the target, the user's evaluation is "bad"; therefore, it can be considered that the accuracy level is low for the requirements of the user. Consequently, the limit value is corrected toward the higher accuracy level (to result in more precise level).

In contrast thereto, when the accuracy does not satisfy the target (No in step 314), the additional information deriving unit 17 obtains color regions required for the image information added by the third image, and further obtains the number of pairs to be added required as the third image (step 316: an additional number of pairs derivation process).

Next, the additional information deriving unit 17 creates display information of the additional information screen as shown in FIG. 11, and displays thereof on the display 22 (step 317: an additional information display process). This prompts the user to input the third image.

In other words, in the exemplary embodiment, when the user's evaluation accepted by the user's evaluation acceptance unit 16 is not more than the predetermined criterion (in this case, user's evaluation is "bad"), the image information of the third image is obtained.

Moreover, even if the user's evaluation accepted by the user's evaluation acceptance unit 16 exceeds the predetermined criterion (in this case, user's evaluation is "good"), when the image information pairs do not suffice the required number (in this case, No in step 311), the image information of the third image is obtained.

When the third image is inputted by the user, the third image obtaining unit 18 obtains image information of the third image (step 318: a third image obtaining process and the acceptance process).

Further, the image information obtaining unit 12 selects an image to be used from the first image obtained in step 301 and the third image obtained in step 318 (step 319: an image selection process). Thereafter, the process proceeds to step 302.

According to the first exemplary embodiment and the second exemplary embodiment as described above, the accuracy of plural pairs of image information as to the first image inputted by the user for each color region is displayed, and thereby, it is possible to quantitatively evaluate the color conversion model created based on the first image. Moreover, a user who observed the evaluation can determine whether or not the additional images are needed. Moreover, the user can determine for which color region the additional images are needed. In other words, when the accuracy is low, it is possible to recognize where the problem is.

Moreover, according to the third exemplary embodiment, in addition thereto, a user who observed the accuracy information provides evaluation, and, in response to the result, it is possible to determine whether or not an additional third image is necessary on the image processing device 10 side. Moreover, on this occasion, color regions or additional number of pairs required as the third image can be presented to the user. Moreover, by observing the accuracy after the third image is added, it becomes easier for the user to recognize which image to be inputted has a problem. In other words, when the accuracy is not improved even though the number of images is increased, it can be understood that many images having different directionality in color adjustment are included. Moreover, when the accuracy of the specific color region is not improved even though the number of images is increased, it can be understood that the images containing the color of this color region are insufficient.

This makes it possible to secure the images necessary in each color region and to create the highly accurate color conversion model. Further, the conversion relationship created from the color conversion model also has high accuracy.

Note that, in the first exemplary embodiment to the third exemplary embodiment, description is given of the case in which the screen shown in FIG. 7 is displayed; however, it is possible to display the screen shown in FIG. 6, 8 or 9. In this case, also, upon observing the accuracy, the user can determine whether or not addition of images is necessary, or input evaluation.

Moreover, in the above-described examples, the image before color adjustment is an image photographed by the camera 40; however, the image is not limited thereto, and any image can be adopted.

Further, in FIG. 6 or 7, the portions of "After" may not be displayed until the third image is added. Moreover, it may be possible to display these portions in gray until the third image is added, and after the third image is added, the portions are updated to be changed into the normal display.

Note that the above-described processing performed by the image processing device 10 can be grasped as an image processing method. In other words, it can be considered that the processing performed by the image processing device 10 is an image processing method including at least two processes of the following (I) and (II).

(I) An image information obtaining process that obtains, as to the first image composed of an image before color conversion and an image after color conversion, image information before color conversion and image information after color conversion corresponding thereto as an image information pair.

(II) A display information creation process that creates display information displaying accuracy of plural pairs of image information for converting image information of an image of the first image before color conversion into image information of an image after color conversion, the plural pairs of image information being obtained by the image information obtaining process.

Moreover, the above-described processing performed by the display device 20 can be grasped as an image displaying method. In other words, it can be considered that the processing performed by the display device 20 is an image displaying method including at least two processes of the following (III) and (IV).

(III) A display information obtaining process that obtains, when a color conversion property converting image information of an image before color conversion into image information of an image after color conversion is created, as to the first image composed of an image before color conversion and an image after color conversion, display information for displaying accuracy of image information pairs, each being composed of image information before color conversion and image information after color conversion corresponding thereto for each color region.

(IV) A display process that displays accuracy based on the above-described display information.

<Description of Program>

The processing performed by the image processing device 10 in the exemplary embodiments described above is provided as, for example, a program such as application software.

Consequently, the processing performed by the image processing device 10 in the exemplary embodiments can be grasped as a program causing a computer to implement: an acceptance function that accepts image information pairs, each being composed of image information before color conversion and image information after color conversion; an accuracy output function that outputs accuracy of a color conversion property from plural image information pairs accepted by the acceptance function; and a display control function that, when the acceptance function accepts new image information pairs, controls to display, on a display device, at least image information created by color conversion of image information of the new image information pairs before color conversion based on the color conversion property created by the color conversion property creation function from the image information pairs having already been accepted by the acceptance function and image information of the new image information pairs after color conversion.

Moreover, the processing can be grasped as a program causing a computer to implement: an acceptance function that accepts image information pairs, each being composed of image information before color conversion and image information after color conversion; an accuracy output function that outputs accuracy of a color conversion property from plural image information pairs accepted by the acceptance function; a color conversion property creation function that creates a color conversion property from the plural image information pairs accepted by the acceptance function; and a display control function that controls to display the accuracy outputted by the accuracy output function on a display device for each color region.

Note that it is possible to provide the program that implements the exemplary embodiment by a communication tool, of course, and it is also possible to store thereof in a storage medium, such as a CD-ROM, to be provided.

The foregoing description of the present exemplary embodiments of the present invention has been provided for the purposes of illustration and description. It is not intended to be exhaustive or to limit the invention to the precise forms disclosed. Obviously, many modifications and variations will be apparent to practitioners skilled in the art. The present exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing device comprising:
    a computer-readable memory having stored therein program instructions; and
    a processor configured to execute the program instructions, that when executed implement:
        an acceptance unit that accepts an image information pair composed of image information before color conversion and image information after color conversion;
        an accuracy output unit that outputs accuracy of a color conversion property from a plurality of the image information pairs accepted by the acceptance unit;
        a color conversion property creation unit that creates the color conversion property from a plurality of the image information pairs accepted by the acceptance unit; and
        a display control unit that, when the acceptance unit accepts a new image information pair, controls to display, on a display device, at least image information created by color conversion of image information of the new image information pair before color conversion based on the color conversion property created by the color conversion property creation unit from the image information pair that has already been accepted by the acceptance unit and image information of the new image information pair after color conversion.

2. The image processing device according to claim 1, wherein the display control unit controls to display, on the display device, the accuracy of the color conversion property before and after the new image information pair is added.

3. The image processing device according to claim 1, wherein the display control unit controls to display, on the display device, a user's evaluation acceptance screen that accepts user's evaluation of color conversion of image information of the image information pair before color conversion.

4. The image processing device according to claim 3, wherein, when the user's evaluation accepted by the user's evaluation acceptance screen is not higher than a predetermined criterion, the display control unit controls to display, on the display device, an image for further accepting an image information pair.

5. The image processing device according to claim 4, wherein the display control unit controls to display, on the display device, a color region required to an image information pair to be further accepted.

6. The image processing device according to claim 4, wherein the display control unit controls to display, on the display device, the number of pairs to be added that is required as an image information pair to be further accepted.

7. The image processing device according to claim 1, wherein the display control unit controls to display, on the display device, a sufficiency level of the image information pair required to create the color conversion property.

8. The image processing device according to claim 7, wherein the display control unit controls to display, on the display device, the sufficiency level of the image information pair before and after the image information pair is obtained.

9. An image processing system comprising:
    a photographing device that takes a photograph of a photographing subject; and
    an image processing device that applies color conversion to an image taken by the photographing device, wherein
    the image processing device comprises:
    a computer-readable memory having stored therein program instructions; and
    a processor configured to execute the program instructions, that when executed implement:
    an acceptance unit that accepts an image information pair composed of image information before color conversion and image information after color conversion;
    an accuracy output unit that outputs accuracy of a color conversion property from a plurality of the image information pairs accepted by the acceptance unit;
    a color conversion property creation unit that creates the color conversion property from the plurality of the image information pairs accepted by the acceptance unit; and
    a display control unit that, when the acceptance unit accepts a new image information pair, controls to display, on a display device, at least image information created by color conversion of image information of the new image information pair before color conversion based on a color conversion property created by the color conversion property creation unit from the image information pair that has already been accepted by the acceptance unit and image information of the new image information pair after color conversion.

10. A non-transitory computer readable medium storing a program that causes a computer to execute functions, the functions comprising:
    accepting an image information pair composed of image information before color conversion and image information after color conversion;
    outputting accuracy of a color conversion property from a plurality of the accepted image information pairs;
    creating the color conversion property from the plurality of the accepted image information pairs; and,
    when a new image information pair is accepted, controlling to display, on a display device, at least image information created by color conversion of image information of the new image information pair before color conversion based on the color conversion property created from the image information pair that has already been accepted and image information of the new image information pair after color conversion.

\* \* \* \* \*